United States Patent
Simon et al.

(10) Patent No.: US 12,425,680 B2
(45) Date of Patent: Sep. 23, 2025

(54) METHOD AND DEVICE FOR CONTROLLING DATA STREAM REPRODUCTION, NETWORK RECORDER, PERSONAL RECORDER AND REPRODUCTION DEVICE

(71) Applicant: ORANGE, Issy-les-Moulineaux (FR)

(72) Inventors: Pierre-Henri Simon, Chatillon (FR); Antoine Gouraud, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 92 days.

(21) Appl. No.: 18/557,421

(22) PCT Filed: Apr. 28, 2022

(86) PCT No.: PCT/FR2022/050823
§ 371 (c)(1),
(2) Date: Oct. 26, 2023

(87) PCT Pub. No.: WO2022/229572
PCT Pub. Date: Nov. 3, 2022

(65) Prior Publication Data
US 2024/0276059 A1 Aug. 15, 2024

(30) Foreign Application Priority Data
Apr. 29, 2021 (FR) .................................... 2104474

(51) Int. Cl.
*H04N 21/43* (2011.01)
*H04N 21/00* (2011.01)
(Continued)

(52) U.S. Cl.
CPC ..... *H04N 21/4325* (2013.01); *H04N 21/4334* (2013.01)

(58) Field of Classification Search
CPC ........ H04N 21/43; H04N 21/00; G11B 17/00; G11B 20/00; G11B 23/00
(Continued)

(56) References Cited

U.S. PATENT DOCUMENTS 8,229,280 B2 * 7/2012 Park .................. H04N 21/4335
386/294
2007/0133938 A1 6/2007 Park

FOREIGN PATENT DOCUMENTS

| EP | 1292135 A2 | 3/2003 |
|----|------------|--------|
| EP | 1788805 A2 | 5/2007 |
| EP | 2346238 A2 | 7/2011 |

OTHER PUBLICATIONS

International Search Report dated Aug. 18, 2022 for corresponding International Application No. PCT/FR2022/050823, filed Apr. 28, 2022.
(Continued)

*Primary Examiner* — Daquan Zhao
(74) *Attorney, Agent, or Firm* — David D. Brush; Westman, Champlin & Koehler, P.A.

(57) ABSTRACT

In the field of data stream transmission, a method of controlling reproduction, especially time-shifted reproduction, of transmitted data streams, including at least a first transmitted data stream and a second data stream, the first stream and the second stream being separate streams, at least one data stream which includes the first transmitted data stream being stored for a predetermined remanence time. The control method includes, during a command to reproduce the second data stream, storing the duration of a shift for reproducing the first stored data stream which is being reproduced. Thus, since the duration of the shift is stored, it can be used to automate the reproduction of any data stream while taking into account the time-shift when changing channels, thus avoiding the reproduction of the live stream,
(Continued)

which can disturb the user, in particular by spoiling the viewing of the previous data in the stream (for example, the score of a match, the end of a film, etc.).

12 Claims, 6 Drawing Sheets

(51) Int. Cl.
  *H04N 21/432* (2011.01)
  *H04N 21/433* (2011.01)
  *G11B 17/00* (2006.01)
  *G11B 20/00* (2006.01)

(58) Field of Classification Search
  USPC .............. 386/343, 344, 349, 350, 351, 291
  See application file for complete search history.

(56) References Cited

OTHER PUBLICATIONS

Written Opinion of the International Searching Authority dated Aug. 18, 2022 for corresponding International Application No. PCT/FR2022/050823, filed Apr. 28, 2022.
English translation of the Written Opinion of the International Searching Authority dated Aug. 18, 2022 for corresponding International Application No. PCT/FR2022/050823, filed Apr. 28, 2022.

\* cited by examiner

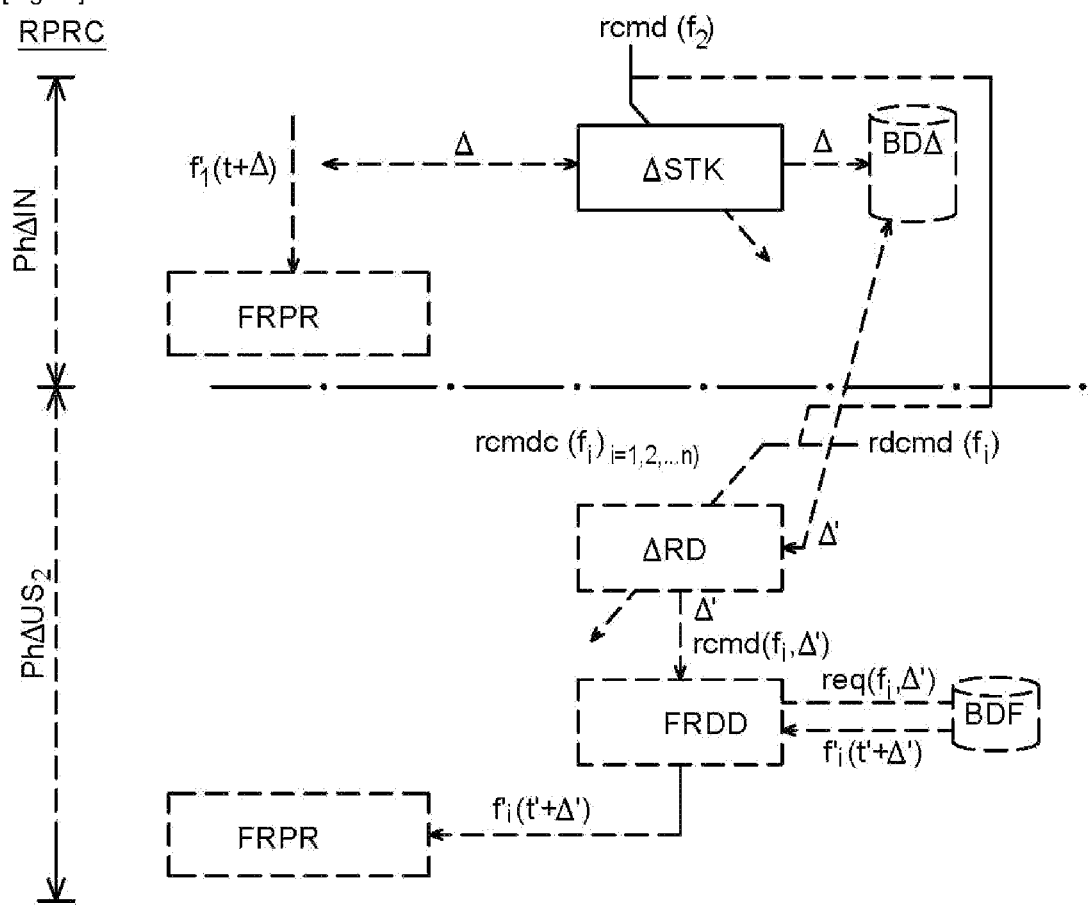

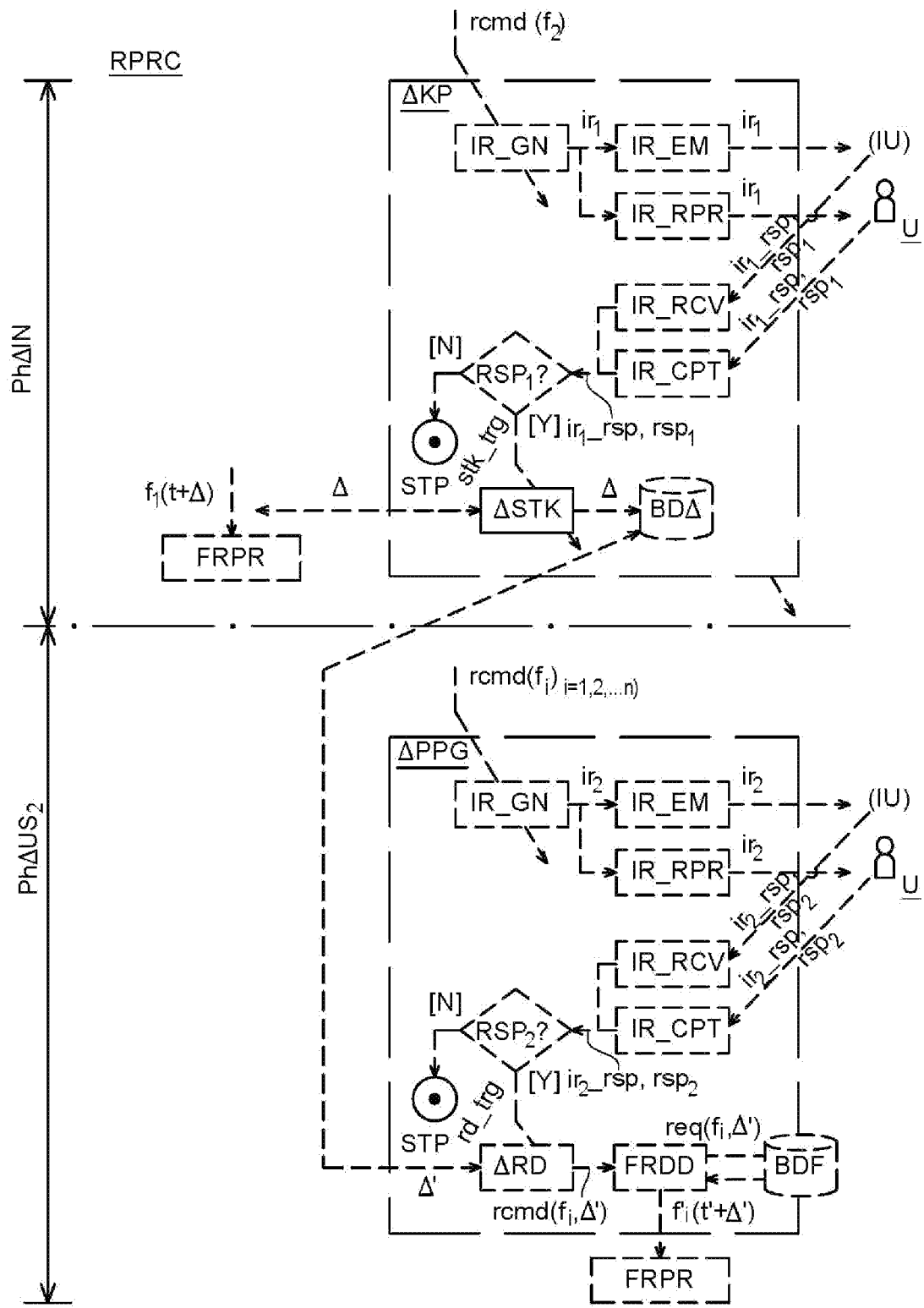

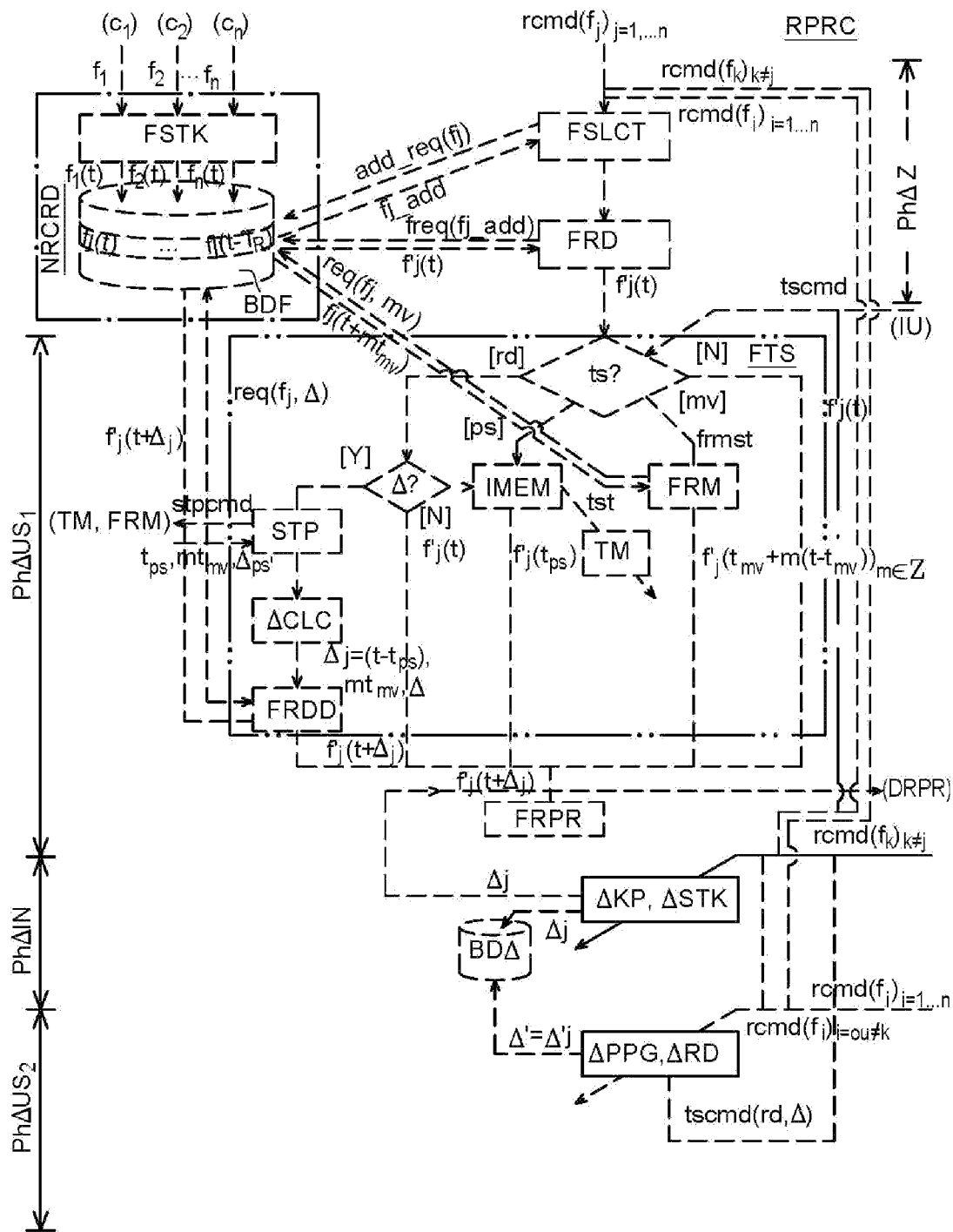
[Fig 2]

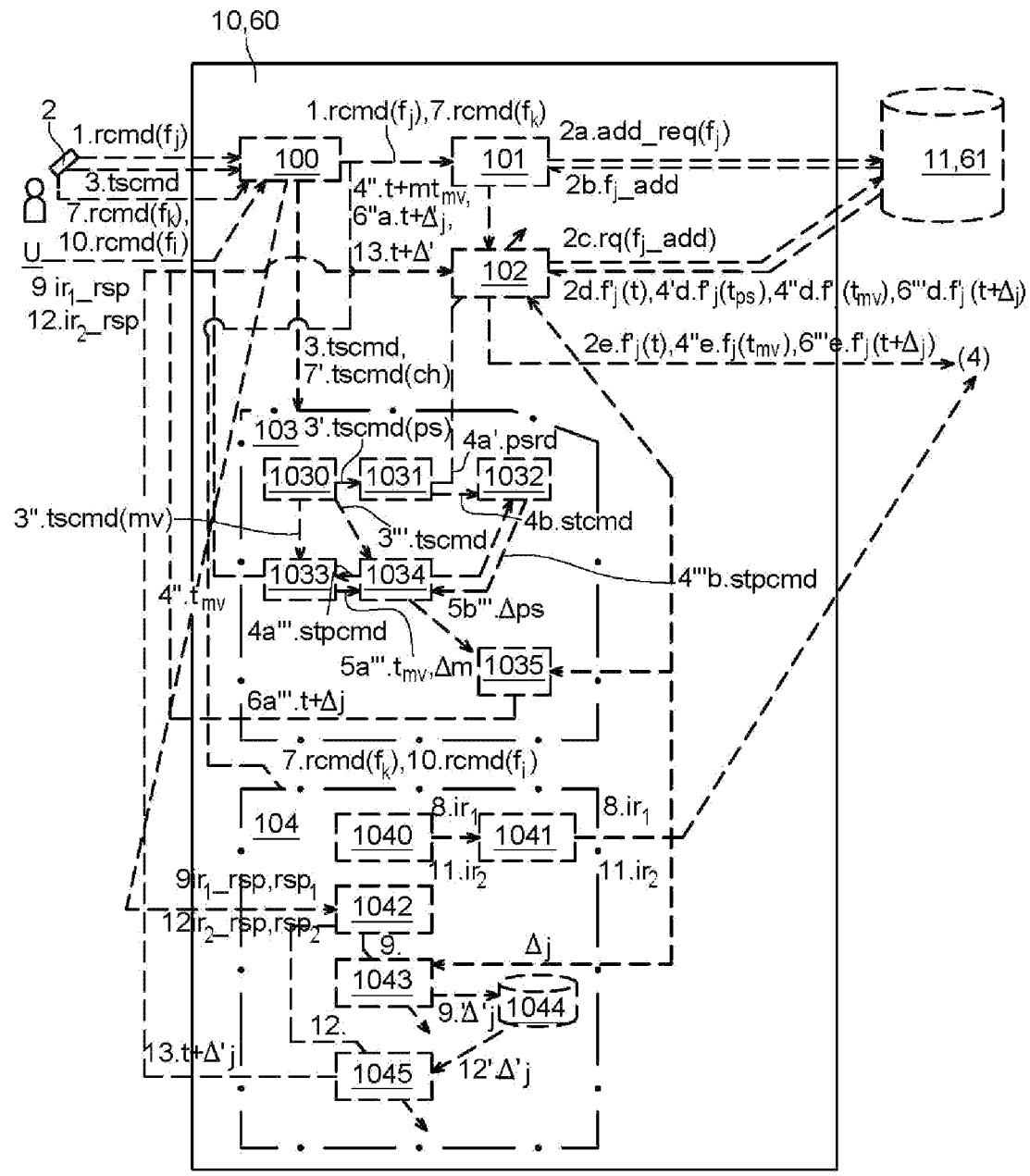
[Fig 3]

[Fig 4a]
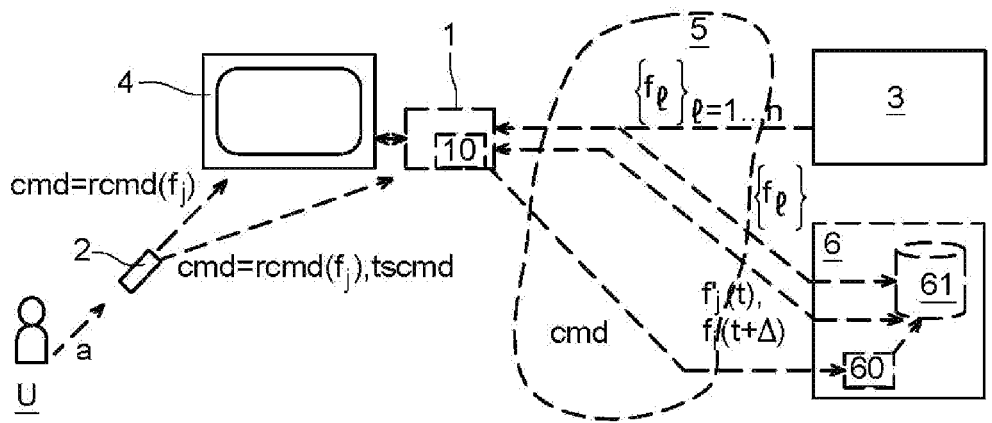
[Fig 4b]
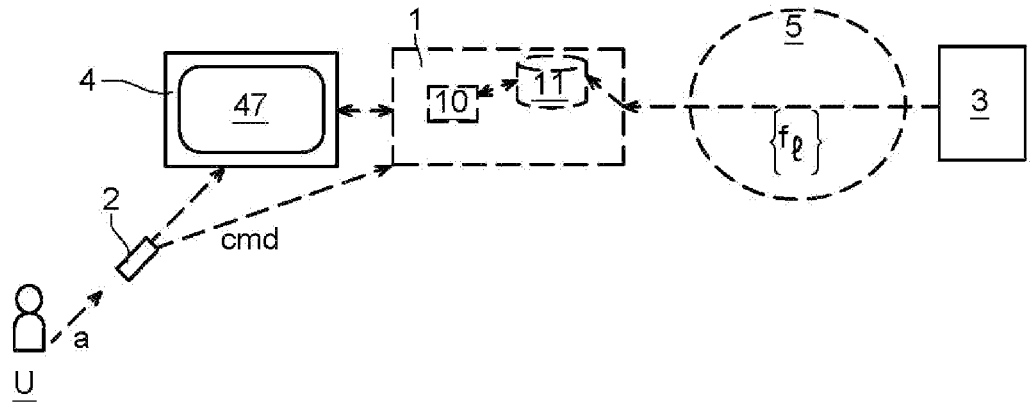
[Fig 4c]
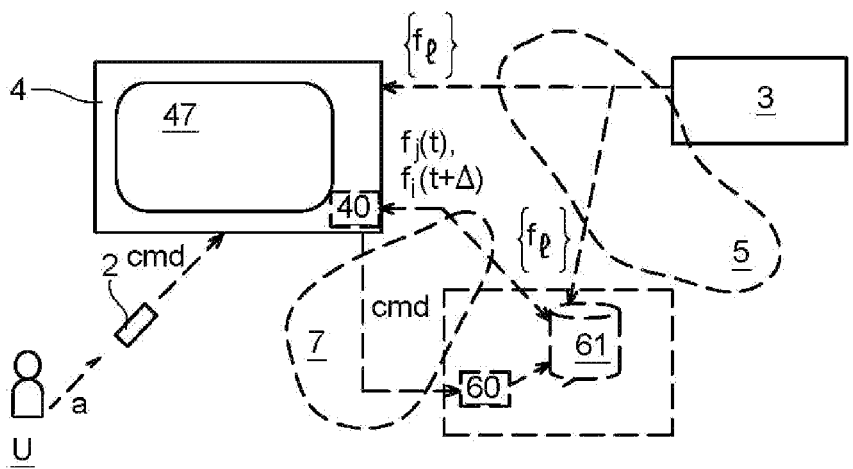

[Fig 5a]
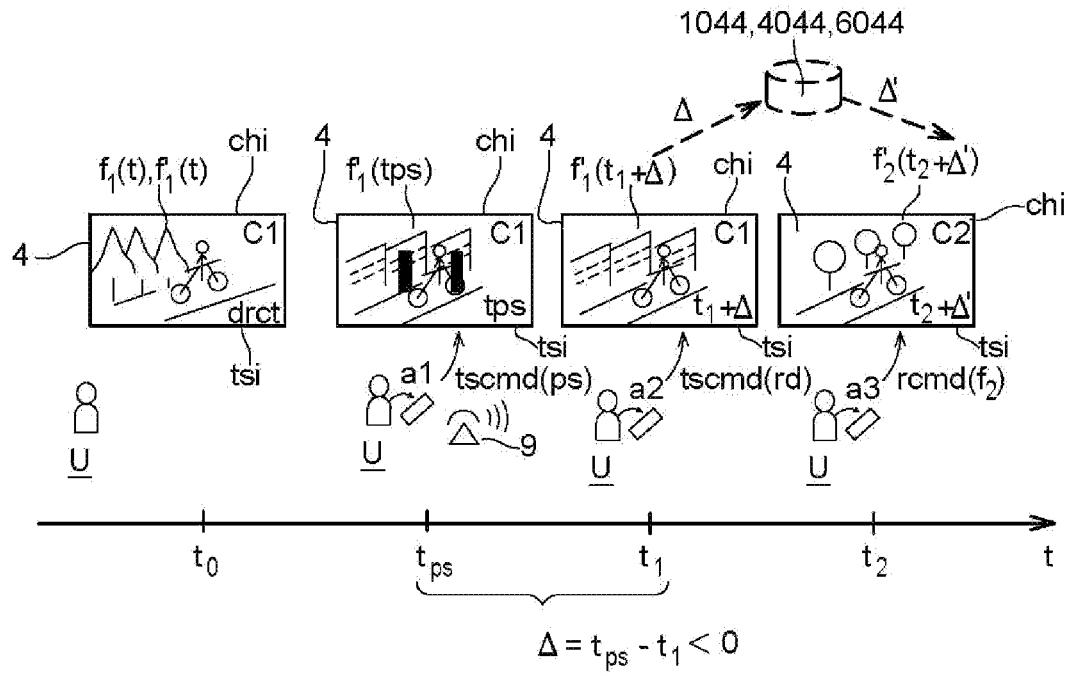
[Fig 5b]
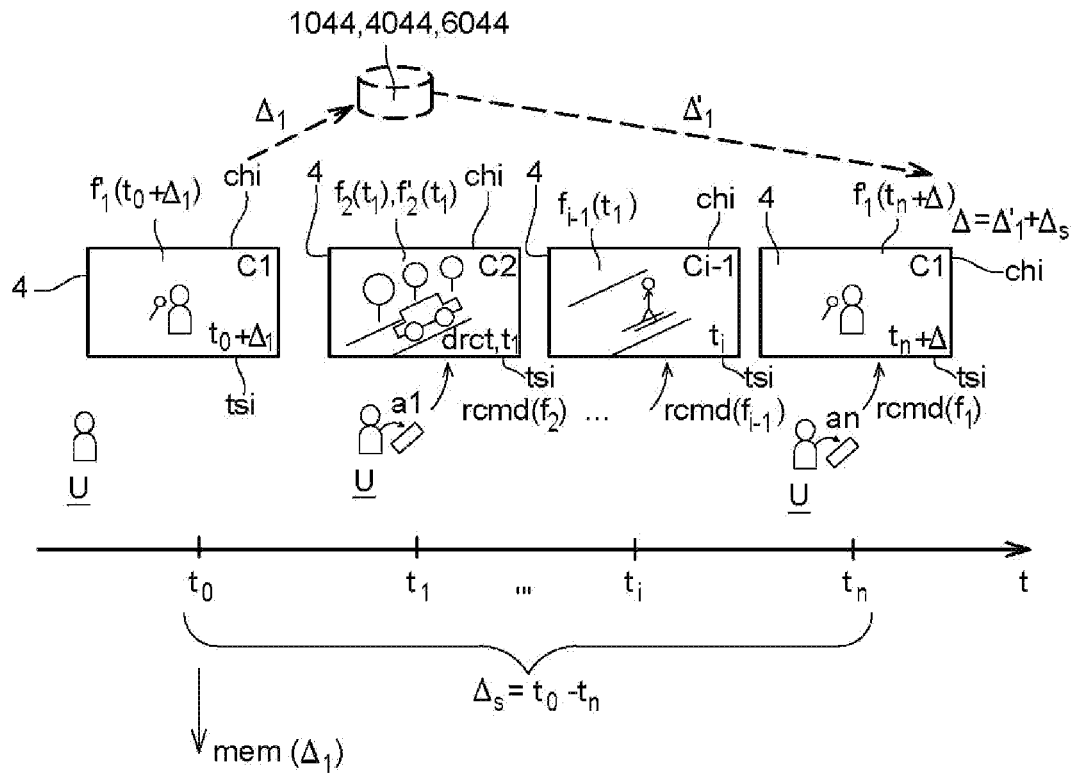

METHOD AND DEVICE FOR CONTROLLING DATA STREAM REPRODUCTION, NETWORK RECORDER, PERSONAL RECORDER AND REPRODUCTION DEVICE

CROSS-REFERENCE TO RELATED APPLICATIONS

This Application is a Section 371 National Stage Application of International Application No. PCT/FR2022/050823, filed Apr. 28, 2022, which is incorporated by reference herein in its entirety and published as WO 2022/229572 A1 on Nov. 3, 2022, not in English.

TECHNICAL FIELD

The invention relates to the field of transmitting data streams and more specifically to controlling their reproduction, notably time-shifted reproduction.

PRIOR ART

The reproduction of television content broadcast via streams has significantly evolved over recent years, notably since the emergence of PVR personal recorders with an integrated hard drive, and then of data stream decoders for receiving via a wired communication network and of IP television.

Personal Video Recorders (PVR) have always provided means for controlling the reproduction of recorded content: stopping on an image, also called pausing, fast-forwarding and fast-rewinding (optionally with several speeds), skipping chapter-by-chapter. With the integration of hard drives into these personal recorders, in TV decoders or in terminals connected to the Internet for receiving IP television, manufacturers have modified their products in order to make these functions available for directly reproduced broadcast streams.

To this end, these devices currently comprise means for controlling the reproduction of streams, also called "live control" or "time-shifting". The recorder, for example, comprises a hard drive that acts as a storage area for conventionally recording content: programmed recording (date and time of the start and the end of recording, recording channel, optionally the recording frequency) or live recording of the content that is being reproduced (from the "REC" recording command for a predefined duration or until the stop recording command occurs, etc.) and, at least partly, from a cyclic memory. This cyclic memory conserves the last N minutes of a predetermined stream on a sliding scale as a function of the command allowing the user to select the stream to be reproduced, since it is the stream that is currently being reproduced from the time of commanding the reproduction of said stream. The time-shift thus proposed for the user provides an interaction with the directly reproduced broadcast content.

The disadvantage of this live control is that if the user changes station, i.e., a transmission channel, the user, at least where they access the new station, will not have fast-rewinding available since the data stream of this new transmission channel that is being reproduced will not have been stored in the cyclic memory. In order to be able to grant access to this function over all the broadcast data streams, a proposal has been contemplated for equipping the network in which the data streams are transmitted with a network recorder, with said recorder comprising a cyclic memory such as that implemented on the personal recorder allowing not only the reproduced data stream to be recorded but at the same time allowing all the data streams corresponding to each of the transmission channels accessible by the reproduction device of the user (TV decoder, connected TV, etc.) to be recorded. Thus, a user accessing a new station, for example, in the middle of a debate, can control whether to fast-rewind to the start of the debate or to the start of the chapter of the content that is being reproduced. The user will therefore have all the functions for live control on all the stations, including from the first second for reproducing a new data stream.

However, this requires manipulations by the user, which can be a source of errors and of time losses.

Indeed, using the example of a user viewing a film broadcast on a first station or transmission channel. They are interrupted by a call, for example. They then command the reproduction of the broadcast film to be paused. When they hang up with their caller, they resume viewing of their film with a time-shift. However, this user had planned to watch this film precisely because it finished before the start of a basketball match that they wish to watch. With the time-shift, currently, when they change station after the end of the film in order to watch this match, the reproduced video stream shows the match already started with the score at the actual time the station was changed (in this case at the end of the first quarter). Therefore, not only is the user disappointed because they missed the start of the match, even if, by virtue of the network recorders, they can optionally rewind to the start of the match, but, in addition, viewing the start of the match is spoilt because they already know the score of the match at the end of the first quarter.

In another case, the live retransmission of an event is successively provided by different television stations. If the reproduction of the data stream relating to this event transmitted by the first station is time-shifted, for one reason or another, for example, an interruption when viewing the reproduction of the event, rewinding to an important moment, when switching the retransmission between a first station and a second station, the user will not change the station at this exact moment, but only at the end of the time-shifted reproduction of the data stream relative to this event transmitted by the first station. Then, at best the reproduced stream relating to this event transmitted by the second station will be live, at worst the reproduced stream transmitted by the second station does not correspond to this event since the time-shift is too great. In the first case, this results in the user losing information, which user optionally can, by virtue of the network recorders, return to the start of the match, but, in addition, this in-between viewing (i.e., between the end of reproduction of the stream transmitted by the first station and the start of reproduction of the stream transmitted by the second station) is spoilt because the user has viewed data after this in-between viewing. In the second case, the user may believe they have selected the wrong station and may not see the end of the retransmission of the event.

DISCLOSURE OF THE INVENTION

One of the aims of the present invention is to provide improvements compared to the prior art.

An aim of the invention is a method for controlling the reproduction of transmitted data streams, including at least one first transmitted data stream and one second data stream, the first stream and the second stream being separate streams, with at least one data stream including the first transmitted data stream being stored for a predetermined remanence duration, the control method comprising, during a command for reproducing a second transmitted data stream, storing the reproduction time-shift duration for a first stored data stream that is being reproduced.

Thus, since the duration of the time-shift is stored, it can be used to automate a reproduction of any data stream while taking into account the time-shift when changing station, thus avoiding live reproduction, which can annoy the user, notably by spoiling the viewing of the preceding data in the stream (for example, the score of a match, the end of a film, etc.).

Advantageously, the control method comprises time-shifted playback of data streams triggered by a command for reproducing a data stream, with the time-shifted playback resulting in the reproduction, as a function of the stored time-shift duration, of the stored data stream.

Thus, if the user accesses a new station, the reproduction of the data stream corresponds to the reproduction of the stored data stream of this new station from a time marker corresponding to a time-shift equal to the stored time-shift duration. If the user flicks over several stations in order to return to the original station, the reproduction of the data stream corresponds to the reproduction of the stored data stream of this original station from a time marker corresponding to a time-shift equal to the time-shift duration stored relative to when channel flicking started or a time-shift equal to the stored/time-shift duration plus the flicking duration. In all cases, the user will not be annoyed by the possible reproduction of data spoiling the remainder of the reproduction of the data stream.

Advantageously, the data stream subsequently reproduced with a time-shift as a function of the stored time-shift duration is a data stream from among the following data streams:
the first stored transmitted data stream;
the second stored transmitted data stream.

Advantageously, the control method comprises, during a command for reproducing a second data stream, a first interaction request triggering a reproduction of a proposal to conserve the time-shift, the storage being implemented in the event of a positive response to the first interaction request.

Thus, the user can choose to conserve the time-shift duration in order to optionally use it during a subsequent reproduction of data streams. This avoids unnecessarily loading the time-shift memory with a time-shift duration that the user knows they will not reuse.

Advantageously, the control method comprises, during a command rcmd for reproducing a new data stream, a second interaction request triggering a reproduction of a proposal to propagate the time-shift to the new data stream, with the time-shifted playback as a function of the stored time-shift duration being implemented on the new stored data stream in the event of a positive response to the second interaction request.

Thus, the user can choose whether or not to use the time-shift duration stored on the incoming data stream when changing station. For example, this avoids unnecessary use of the time-shift duration when simply flicking through stations in order to review the programs being broadcast and therefore avoids an unnecessary use of resources not only for computing the reproduction time-shift, but also for searching for the stream stored with this time-shift with a view to its reproduction.

Advantageously, the new stored data stream reproduced with a time-shift as a function of the stored time-shift duration is a data stream from among the following data streams:
the first stored transmitted data stream;
the second stored transmitted data stream;
a third data stream.

Advantageously, according to one implementation of the invention, the various steps of the method according to the invention are implemented by software or a computer program, with this software comprising software instructions intended to be executed by a data processor of a device forming part of a network recorder, a data stream decoder or a reproduction device and being designed to control the execution of the various steps of this method.

Therefore, a further aim of the invention is a program comprising program code instructions for executing the steps of the control method when said program is executed by a processor.

This program can use any programming language and can be in the form of source code, of object code or of intermediate code between source code and object code, such as in a partially compiled format or in any other desirable format.

A further aim of the invention is a device for controlling the reproduction of transmitted data streams including at least one first transmitted data stream and one second data stream, the first stream and the second stream being separate streams, with at least one data stream including the first transmitted data stream being stored in a stream memory for a predetermined remanence duration, the control device comprising a time-shift memory, the time-shift memory storing, during a command for reproducing a second data stream, a reproduction time-shift duration for a first stored data stream that is being reproduced.

A further aim of the invention is a network recorder comprising:
a stream memory storing, for a predetermined remanence duration, at least one data stream transmitted by a data stream source; and
a reproduction control device comprising:
a time-shift memory storing, during a command for reproducing a second data stream, a reproduction time-shift duration for a first data stream stored in the stream memory that is being reproduced.

Advantageously, the reproduction control device comprises a stream player able to play back the data stream stored in the stream memory with a time-shift as a function of the stored time-shift duration.

A further aim of the invention is a data stream decoder receiving data streams, the data stream decoder comprising:
a data stream selector, the selector sending, to a reproduction device connected to the data stream decoder, the data stream that is at least selected from the transmitted data streams and/or at least one stored data stream corresponding to at least one transmitted data stream stored in a memory;
a reproduction control device, the reproduction control device comprises:
a time-shift memory storing, during a command for reproducing a second data stream, a reproduction time-shift duration for a first stored data stream that is being reproduced.

A further aim of the invention is a data stream reproduction device, the reproduction device comprising:
  an elementary device for reproducing at least one data stream;
  a transmitted data stream selector, the selector sending, to the elementary reproduction device, the data stream that is at least selected from the transmitted data streams and/or at least one stored data stream corresponding to at least one transmitted data stream stored in a memory;
  a reproduction control device, the reproduction control device comprises:
    a time-shift memory storing, during a command for reproducing a second data stream, a reproduction time-shift duration for a first stored data stream that is being reproduced.

BRIEF DESCRIPTION OF THE DRAWINGS

The features and advantages of the invention will become more clearly apparent upon reading the description, which is provided by way of an example, and the figures relating thereto, in which:

FIG. 1a is a simplified diagram of a reproduction control method according to the invention;

FIG. 1b is a non-exhaustive detailed diagram of a reproduction control method according to the invention;

FIG. 2 is a simplified diagram of a reproduction control method according to the invention further comprising live control;

FIG. 3 is a simplified diagram of a reproduction control device according to the invention;

FIG. 4a is a simplified diagram of a first embodiment of a communication architecture comprising the reproduction control device according to the invention;

FIG. 4b is a simplified diagram of a second embodiment of a communication architecture comprising the reproduction control device according to the invention;

FIG. 4c is a simplified diagram of a third embodiment of a communication architecture comprising the reproduction control device according to the invention;

FIG. 5a is a simplified diagram illustrating a first use case of the invention;

FIG. 5b is a simplified diagram illustrating a second use case of the invention.

DESCRIPTION OF THE EMBODIMENTS

FIG. 1a illustrates a simplified diagram of a reproduction control method according to the invention.

The method RPRC for controlling the reproduction of transmitted data streams relates to the reproduction of transmitted data streams $f_{i, i=1 \ldots n}$, including at least one first transmitted data stream $f_1$ and one second transmitted data stream $f_2$, with the first stream and the second stream being separate streams, with at least one transmitted data stream including the first transmitted data stream being stored for a predetermined remanence duration. The control method RPRC comprises, during a command $rcmd(f_2)$ for reproducing a second data stream, storing ΔSTK a reproduction time-shift duration Δ for a first stored data stream $f'_1(t+\Delta)$ that is being reproduced.

The reproduction time-shift duration for a first stored data stream Δ that is being reproduced is understood to mean a time-shift corresponding, notably, to the time-shift between the transmission instant of a datum of the transmitted data stream and the reproduction instant of this same datum of the stored transmitted data stream, or to the time-shift between the reception instant, by the data stream recorder or the device implementing this stream recorder, of a datum of the transmitted data stream and the playback instant, by this recorder, of this same datum of the stored transmitted data stream, or to the time-shift between the reception instant, by the data stream receiver, of a datum of the transmitted data stream and the reception, retrieval or reproduction instant of this same datum of the stored transmitted data stream, etc.

In particular, the reproduction time-shift duration Δ is retrieved and/or computed prior to the reproduction FRPR of streams implemented on the first stored data stream $f_1(t+\Delta)$, notably as a function of the first stored data stream $f_1(t+\Delta)$.

In particular, the reproduction time-shift duration Δ is stored in a time-shift database BDΔ, i.e., a reproduction time-shift duration database. Notably, the time-shift duration is stored in association with an identifier of the first data stream and a stream change instant. The stream change instant corresponds to the instant at which the reproduction of the first stream is interrupted, or by changing the reproduced stream: switching the reproduction of the first stream to the reproduction of the second stream, or stopping reproduction. Thus, resuming the reproduction of the first stream will allow the first stream to be reproduced from the instant at which its reproduction would have been stopped irrespective of the commands and/or reproduction of streams carried out in the meantime, without having to propagate the time-shift to each stream change or limit the conservation of the time-shift to the time-shift of a single stream. Furthermore, while the reproduction of the first stream stored using a first reproduction time-shift duration associated with this first stream is terminated, the reproduction of another stream, for example, the second stream, using a second reproduction time-shift duration (separate from the first time-shift duration) can be implemented.

In particular, the phase beginning with the command $rcmd(f_2)$ for reproducing a second stream, while a reproduction FRPR of a first stored stream $f_1(t+\Delta)$ is ongoing and ending with storing the reproduction time-shift duration Δ, is a first phase PhΔIN, called initialization or conservation phase, of the time-shift.

In particular, in a second phase PhΔUS$_2$, also called propagation phase, of the time-shift, the reproduction time-shift duration Δ' stored in the time-shift conservation phase PhΔIN is used for the reproduction FRPR of a new data stream $f_{i, i=1 \ldots n}$. Notably, the new data stream is the second data stream, the reproduction command $rcmd(f_2)$ of which has triggered the storage ΔSTK of the time-shift conservation phase PhΔIN.

In particular, the control method RPRC comprises time-shifted playback FRDD of data streams triggered by a command $rcmd(f_i)_{i=1 \ldots n}$ for reproducing a data stream. The time-shifted playback FRDD provides, for the reproduction FRPR of data streams, as a function of the stored time-shift duration Δ', the stored data stream $f'_i(t+\Delta')$.

In particular, the data stream $f_i$ subsequently reproduced with a time-shift as a function of the stored time-shift duration Δ' is a data stream from among the following data streams:
  the first stored transmitted data stream $f'_1$;
  the second stored transmitted data stream $f'_2$, separate from the first data stream $f_1$;
  a third stored transmitted data stream $f'_3$, separate from the first and second streams $f_1$, $f_2$.

In a first use case, the reproduction command $rcmd(f_2)$ triggering the storage ΔSTK also triggers the time-shifted playback FRDD, as a function of the stored time-shift duration Δ, in this case of the second stored data stream f'$_2$(t+Δ').

In a second use case, the reproduction FRPR of the second data stream f$_2$ commanded rcmd(f$_2$) before storage ΔSTK is either carried out as a live feed: the reproduced data stream is then either the second transmitted data stream f$_2$(t), or the second stored data stream reproduced without a time-shift f'$_2$(t); or is carried out as a time-shifted feed: the reproduced data stream is then either the second stored stream reproduced with a specific time-shift f'$_2$(t+Δ$_2$) or with the stored time-shift f'$_2$(t+Δ'), as in the first use case. Furthermore, a command rcmd(f$_i$)$_{i \neq 2}$ for reproducing a data stream separate from the second data stream triggers the time-shifted playback of a stored data stream f'$_{i, i \neq 2}$ (t+Δ') using the stored time-shift duration Δ'. Notably, this new data stream is a third separate stored data stream f's separate from the first and second streams f$_1$ and f$_2$. Thus, the time-shift can either be reused on the first stream f$_1$ to resume the reproduction of the first data stream f$_1$ where it stopped, or to propagate to a new data stream, namely a third data stream f$_3$.

In a third use case, the command rcmd(f$_i$)$_{i \neq 2}$ for reproducing a data stream triggering time-shifted playback FRDD relates to a data stream separate from the second data stream. Notably, this new data stream is the first stored data stream f'$_1$, thus the time-shifted playback provides the first stored stream played back as a time-shifted feed f'$_1$(t+Δ') using the stored time-shift duration Δ'.

In particular, the command rcmd(f$_i$)$_{i=1 \ldots n}$ for reproducing a data stream triggering time-shifted playback FRDD triggers playback of the time-shift duration ΔRD, which provides the time-shifted playback FRDD with the stored reproduction time-shift duration Δ'. Notably, playing back the time-shift duration ΔRD searches in a time-shift database for the stored reproduction time-shift duration Δ', for example, as a function of the data stream f$_i$ of the reproduction command rcmd(f$_i$). Optionally, playing back the time-shift duration ΔRD modifies the reproduction command rcmd(f$_i$) by integrating the played back time-shift duration Δ' therein and supplies the time-shifted playback FRDD with the modified reproduction command rcmd(f$_i$,Δ').

In particular, time-shifted playback requests req(f$_i$,Δ') the data stream f$_i$ of the reproduction command rcmd(f$_i$) from a stream database BDF with a time time-shift equal to the stored time-shift Δ', notably read by reading the time-shift duration ΔRD.

The stream database BDF is a database in which at least one transmitted data stream is stored, including the first data stream. In the first use case above, the second transmitted data stream is also stored in the stream database BDF. In the second use case above, a third transmitted data stream is stored in the stream database BDF in addition to the first stream, or even to the second stream.

Thus, time-shifted playback retrieves, from the stream database, the stored data stream f$_i$(t+Δ') corresponding to the data stream for which reproduction has been commanded rcmd(f$_i$), with a time-shift as a function of the stored time-shift duration Δ'.

FIG. 1b illustrates a non-exhaustive detailed diagram of a reproduction control method according to the invention.

The method RPRC for controlling the reproduction of transmitted data streams relates to the reproduction of transmitted data streams f$_{i, i=1 \ldots n}$, including at least one first transmitted data stream f$_1$ and one second transmitted data stream f$_2$, the first stream and the second stream being separate streams, with at least one transmitted data stream including the first transmitted data stream being stored for a predetermined remanence duration. The control method RPRC comprises, during a command rcmd(f$_2$) for reproducing a second data stream, storing ΔSTK a reproduction time-shift duration Δ for a first stored data stream f'$_1$(t+Δ) that is being reproduced.

In particular, the control method RPRC comprises checking a first interaction RSP$_1$? of a user U, notably following a reproduction IR_RPR, optionally by a user interface IU, of a first interaction request ir$_1$. The check RSP$_1$? triggers stk_trg the storage ΔSTK as a function of the first interaction ir$_1$_rsp, rsp$_1$, notably if a response to the first interaction request is positive ir$_1$_rsp, rsp$_1$=[Y], the first interaction comprises a command for conserving the time-shift, etc.

In particular, the first interaction ir$_1$_rsp, rsp$_1$ is either received IR_RCV from the user interface IU or is captured IR_CPT from the user U.

In a particular embodiment, the control method RPRC comprises, during a command rcmd(f$_2$) for reproducing a second data stream, a first interaction request in triggering a reproduction of a proposal for maintaining the time-shift, with the storage ΔSTK being implemented in the event of a positive response to the first interaction request ir$_1$_rsp=[Y].

In particular, the control method RPRC comprises checking the response to the first interaction request. Checking the response to the first interaction request involves checking a first interaction RSP$_1$?. Checking RSP$_1$? triggers stk_trg the storage ΔSTK if the response is positive ir$_1$_rsp=[Y].

In particular, the control method RPRC comprises generating an interaction request IR_GN generating a first interaction request ir$_1$ notably comprising a proposal for maintaining the reproducible time-shift.

Generating an interaction request is notably a function of the reproduction command rcmd(f$_2$) and/or of the data stream f$_1$ that is being reproduced and/or of the reproduction time-shift duration Δ for the data stream that is being reproduced. In particular, the generation IR_GN selects and/or modifies at least one proposal from a conservation proposal list previously stored as a function of the reproduction command rcmd(f$_2$) and/or of the data stream f$_1$ that is being reproduced and/or of the reproduction time-shift duration Δ for the data stream that is being reproduced. For example, the proposal takes into account the type of content of the first stream and/or of the second stream, and even integrates the reproduction time-shift duration Δ.

In particular, the first interaction request ir$_1$ provided by the generation IR_GN is reproduced IR_RPR or transmitted IR_EM to a user interface IU in order to be reproduced for the user U.

In particular, the response to the first interaction request ir$_1$_rsp is either received IR_RCV from the user interface IU or is captured IR_CPT from the user U following the reproduction IR_RPR by the user interface IU of the first interaction request.

In a particular embodiment, the reproduction control method RPRC comprises conserving the time-shift ΔKP implementing the storage ΔSTK and, optionally, an additional step from among the following steps:
generating a first interaction request IR_GN;
checking a first interaction RSP$_1$?;
issuing a first interaction request IR_EM;
reproducing a first interaction request IR_RPR;
receiving a first interaction IR_RCV;
capturing a first interaction IR_CPT;
stopping the conservation STP.

It should be noted that stopping STP the conservation is triggered when checking a response to the first interaction request RSP$_1$? determines that the response is negative ir$_1$_rsp=[N]. Stopping STP the conservation interrupts the conservation ΔKP prior to storage ΔSTK, but does not remove the durations stored in the time-shift database BDΔ during the previous implementation of the storage ΔSTK.

In particular, the reproduction time-shift duration Δ is retrieved and/or computed prior to the reproduction FRPR of streams implemented on the first stored data $f_i(t+\Delta)$, notably as a function of the first stored data stream $f_1(t+\Delta)$.

In particular, the reproduction time-shift duration Δ is stored in a time-shift database BDΔ, i.e., a reproduction time-shift duration database.

In particular, the phase beginning with the command rcmd($f_2$) for reproducing a second stream, while a reproduction FRPR of a first stored stream $f_1(t+\Delta)$ is ongoing and ending with storing the reproduction time-shift duration Δ, is a first phase PhΔIN, called initialization or conservation phase, of the time-shift.

In particular, in a second phase PhΔUS$_2$, also called propagation phase, of the time-shift, the reproduction time-shift duration Δ' stored in the conservation phase PhΔIN of the time-shift is used for the reproduction FRPR of a new data stream $f_i$, $_{i=1\ldots n}$. Notably, the new data stream is the second data stream, the reproduction command rcmd($f_2$) of which has triggered the storage ΔSTK of the conservation phase PhΔIN of the time-shift.

In particular, the control method RPRC comprises time-shifted playback FRDD of data streams triggered by a command rcmd($f_i$)$_{i=1\ldots n}$ for reproducing a data stream. The time-shifted playback FRDD provides, for the reproduction FRPR of data streams, as a function of the stored time-shift duration Δ', the stored data stream $f'_i(t+\Delta')$.

In particular, the data stream $f_i$ subsequently reproduced with a time-shift as a function of the stored time-shift duration Δ' is a data stream from among the following data streams:
  the first stored transmitted data stream $f'_1$;
  the second stored transmitted data stream $f'_2$, separate from the first data stream $f_1$;
  a third stored transmitted data stream $f'_3$, separate from the first and second streams $f_1$, $f_2$.

In particular, the command rcmd($f_i$)$_{i=1\ldots n}$ for reproducing a data stream triggering time-shifted playback FRDD triggers reading of the time-shift duration ΔRD, which provides the time-shifted playback FRDD with the stored reproduction time-shift duration Δ'. Notably, reading the time-shift duration ΔRD searches in a time-shift database for the stored reproduction time-shift duration Δ', for example, as a function of the data stream $f_i$ of the reproduction command rcmd($f_i$). Optionally, reading the time-shift duration ΔRD modifies the reproduction command rcmd($f_i$) by integrating the read time-shift duration Δ' therein and supplies the time-shifted playback FRDD with the modified reproduction command rcmd($f_i$,Δ').

In particular, the time-shifted playback requests req($f_i$,Δ') the data stream $f_i$ of the reproduction command rcmd($f_i$) from a stream database BDF with a time time-shift equal to the stored time-shift Δ', notably read by reading the time-shift duration ΔRD.

The stream database BDF is a database in which at least one transmitted data stream is stored, including the first data stream. In the first use case above, the second transmitted data stream is also stored in the stream database BDF. In the second use case above, a third transmitted data stream is stored in the stream database BDF in addition to the first stream, or even to the second stream.

Thus, the time-shifted playback retrieves, from the stream database, the stored data stream $f'_i(t+\Delta')$ corresponding to the data stream for which reproduction has been commanded rcmd(fi), with a time-shift as a function of the stored time-shift duration Δ'.

In particular, the control method RPRC comprises checking a second interaction RSP$_2$? of a user U, notably following a reproduction IR_RPR, optionally by a user interface IU, of a second interaction request ir$_2$. The check RSP$_2$? triggers rd_trg the time-shifted playback FRDD, or even reading of the time-shift duration ΔRD providing the time-shifted playback FRDD with the stored reproduction time-shift duration Δ', as a function of the second interaction ir$_2$_rsp, rsp$_2$, notably if a response to the second interaction request is positive ir$_2$_rsp, rsp$_2$=[Y], the second interaction comprises a command for propagating the time-shift, etc.

In particular, the second interaction ir$_2$_rsp, rsp$_2$ is either received IR_RCV from the user interface IU or captured IR_CPT from the user U.

In particular, the control method RPRC comprises, during a command rcmd($f_i$) for reproducing a new data stream, a second interaction request ir$_2$ triggering a reproduction of a proposal for propagating the time-shift to the new data stream, with time-shifted playback FRDD as a function of the stored reproduction time-shift duration Δ' being implemented on the new stored data stream $f'_i$ as a function of the second interaction ir$_2$_rsp, rsp$_2$, notably if a response to the second interaction request is positive ir$_2$_rsp, rsp$_2$=[Y], the second interaction comprises a command for propagating the time-shift, etc.

In a particular embodiment, the reproduction control method RPRC comprises propagating the time-shift ΔPPG implementing the time-shifted playback FRDD and, optionally, an additional step from among the following steps:
  reading the time-shift duration ΔRD;
  generating a second interaction request IR_GN;
  checking a second interaction RSP$_2$?;
  issuing a second interaction request IR_EM;
  reproducing a second interaction request IR_RPR;
  receiving a second interaction IR_RCV;
  capturing a second interaction IR_CPT;
  stopping the propagation STP.

It should be noted that stopping STP the conservation is triggered when checking a response to the first interaction request RSP$_1$? determines that the response is negative ir$_1$_rsp=[N]. Stopping STP the conservation interrupts the conservation ΔKP prior to storage ΔSTK, but does not remove the durations stored in the time-shift database BDΔ during the previous implementation of the storage ΔSTK.

In particular, the new reproduced stored data stream $f'_i$ with a time-shift as a function of the stored time-shift duration Δ' is a data stream from among the following data streams:
  the first stored transmitted data stream $f'_1$;
  the second stored transmitted data stream $f'_2$;
  a third stored transmitted data stream $f'_3$.

Thus, the control method RPRC then reproduces FRPR the new stored time-shifted stream as a function of the stored time-shift duration, for example, $f'_i(t+\Delta')$.

FIG. 2 illustrates a simplified diagram of a reproduction control method according to the invention further comprising live control.

In particular, the reproduction control method RPRC comprises stream storage FSTCK able to record at least one transmitted data stream $f_1, f_2, \ldots, f_n$ for a predetermined remanence duration $T_R$, notably in a stream database BDF. Thus, at a current instant t, stream storage FSTCK records the data transmitted from the one or more streams to be recorded, or even from all the transmitted streams $f_1(t)$, $f_2(t), \ldots, f_n(t)$. Consequently, the data in the recorded data stream $f_j$ corresponds to the data transmitted via the data stream from the instants $t-T_R$ to the instant t, that is $f_j(t-T_R) \ldots f_j(t)$.

Each of the streams $f_1, f_2, \ldots, f_n$ is optionally transmitted by means of separate transmission channels $c_1, c_2, \ldots, c_n$, notably over separate broadcasting frequencies (for example, Hertzian, TNT broadcast).

In particular, the reproduction control method RPRC includes stream selection FSLCT receiving a command $rcmd(f_j)$ for reproducing a data stream allowing retrieval, from among the recorded streams, of the stream for which reproduction has been commanded: $(f_j)(t)$. The data retrieved from the stream corresponds to the data of the stream at the current instant t, also called live stream: $f'_j(t)$. This retrieved stream $f'_j(t)$ is provided for the reproduction FRPR (illustrated in FIGS. 1a and 1b).

In particular, stream selection SLCT sends a stream request, notably a request add_req ($f_j$) for the storage address of the stream when the stream is recorded in a stream database BDF comprising several data streams. In response to this request, the live stream $f_j$ is retrieved either directly by the selection FSLCT or by stream playback FRD. In the event that the selection FSLCT requests add_req ($f_j$) an address, it retrieves the address $f_j$_add of the stream from the stream database BDF and makes it available for stream playback FRD that requests the stream located at the received address freq ($f_j$_add).

During this phase, which comprises the selection of streams FSLCT and optionally one or more of the following steps:
 reading the stream FRD;
 recording the stream FSTCK;
the stream supplied for reproduction is a live feed, i.e., it is not a time-shifted feed. This phase is called the time-shift-free phase Ph$\Delta$Z.

In particular, the reproduction control method RPRC comprises an analysis ts? receiving a time-shift command tscmd, notably from a user interface IU, and checking which reproduction time-shift action it corresponds to. For example, the analysis ts? checks whether the time-shift command corresponds to an action that notably includes the following actions:
 [rd] an action involving playing back the stream from the instant on the stream when the preceding action stopped;
 [ps] an action involving pausing playback of the stream at the instant on the stream when the preceding action stopped;
 [mv] an action involving forwarding or rewinding at a given speed on the stream from the instant on the stream when the preceding action stopped.

In the event that the analysis ts? determines that no time-shift action has been commanded or that the time-shift command tscmd commands returning to a live feed, then the analysis determines that no action is commanded [N] and transmits the read stream as a live feed $f'_j(t)$ for the reproduction FRPR of streams.

In the event that the analysis ts? determines a pause action [ps], the analysis triggers the conservation IMEM of the retrieved/read data $f'_j(t_{ps})$ corresponding to the instant of the stream when the pause action is triggered $t_{ps}$, with the conservation IMEM supplying this data $f'_j(t_{ps})$ for the reproduction FRPR, and, in particular, starts tst a measurement TM of the pause time, for example, using a timer.

In the event that the analysis ts? determines a fast-forward or fast-rewind action [mv], the analysis ts? triggers frmst fast playback FRM of the stream with a predefined speed m (positive in the case of fast-forwarding and negative in the case of fast-rewinding) from the triggering instant $t_{mv}$ and provides the retrieved/read data $f_j(t_{mv}+m(t-t_{mv}))$ for the reproduction FRPR.

In the event that the analysis ts? determines a playback action [rd], the analysis triggers stopping STP, using a stop command stpcmd, of the preceding actions, notably measuring the pause duration TM and fast stream playback FRM, retrieves, as a function of the preceding action, namely, pause [ps], fast playback [mv], respectively, the pause instant $t_{ps}$, and/or the pause duration $\Delta_{ps}$, the instant of the stream read during fast playback when stopping fast playback $t_{fr}=t_{mv}+m(t-t_{mv})$, and provides the time-shifted playback FRDD with the instant from which the stream is to be read as a function of the retrieved instants: respectively, from the pause instant $t_{ps}$ and from the instant for stopping fast playback $t_{fr}$, or the reproduction time-shift duration $\Delta_j$ corresponds to the pause duration $\Delta_{ps}$ or the time gap between the current instant t and the instant reproduced before stopping the preceding action, respectively $t_{ps}, t_{fr}$.

In particular, the reproduction control method RPRC then comprises, prior to the time-shifted playback FRDD, computing $\Delta$CLC the reproduction time-shift duration $\Delta_j$ corresponding to the pause duration $\Delta_{ps}$ or the time gap between the current instant t and the instant reproduced before stopping the preceding action, respectively $t_{ps}, t_{fr}$.

Thus, time-shifted playback FRDD provides the reproduction FRPR with the data stream to be reproduced $f'j(t+\Delta_j)$ with a time-shift corresponding to the reproduction time-shift due to the preceding action. The reproduction FRPR is notably implemented either by the reproduction control method RPRC or by a reproduction device DRPR.

In a particular embodiment, the reproduction control method RPRC comprises a time-shift of the reproduction of the stream FTS implementing the time-shift command analysis ts? and, optionally, an additional step from among the following steps:
 conserving IMEM the retrieved/read data $f'_j(t_{ps})$ corresponding to the instant of the stream when the pause action is triggered $t_{ps}$;
 measuring the pause duration TM;
 fast playback FRM;
 stopping STP;
 computing the reproduction time-shift duration $\Delta$CLC;
 time-shifted playback FRDD.

The phase beginning with the analysis of the time-shift command ts? and ending with the provision of a time-shifted $f'_j(t+\Delta_j)$ or non-time-shifted $f'_j(t)$ data stream for the reproduction FRPR of streams is called the reproduction time-shift phase Ph$\Delta$US$_1$. The reproduction time-shift duration $\Delta_j$ used in the reproduction time-shift phase Ph$\Delta$US$_1$ is a function of the implemented time-shift commands tscmd.

The control method RPRC comprises, during a command $rcmd(f_{k\neq j})$ for reproducing a second data stream, storing $\Delta$STK and/or conserving $\Delta$KP a reproduction time-shift duration $\Delta$ for reproducing a first stored data stream $f'_j(t+\Delta_j)$ that is being reproduced.

In particular, the reproduction time-shift duration $\Delta$ is retrieved and/or computed $\Delta$CLC prior to the reproduction FRPR of streams implemented on the first stored data $f_1(t+\Delta)$, notably as a function of the first stored data stream $f_1(t+\Delta)$.

In particular, the reproduction time-shift duration $\Delta$ is stored in a time-shift database BD$\Delta$, i.e., a reproduction time-shift duration database. Notably, the time-shift duration $\Delta_j$ is stored in association with an identifier of the first data stream $f_j$ and, optionally, a stream change instant.

In particular, the phase beginning with the command rcmd($f_k$) for reproducing a second stream, while a reproduction FRPR of a first stored stream is ongoing $f_j(t+\Delta_j)$ and ending with storing the reproduction time-shift duration $\Delta_j$, is a first phase PhΔIN, called the initialization or conservation phase, of the time-shift.

In particular, in a second phase PhΔUS$_2$, also called time-shift propagation phase, the reproduction time-shift duration $\Delta'=\Delta'_j$ stored in the time-shift conservation phase PhΔIN is used for the reproduction FRPR of a new data stream $f_{i, i=1 \ldots n}$. Notably, the new data stream is the second data stream whose reproduction command rcmd($f_k$) has triggered the storage ΔSTK and/or the conservation ΔKP of the time-shift conservation phase PhΔIN.

In particular, the control method RPRC comprises time-shifted playback of data streams FRDD triggered by a command rcmd($f_i)_{i=1 \ldots n}$ for reproducing a data stream. Time-shifted playback FRDD provides, for the reproduction of data streams FRPR, as a function of the stored time-shift duration $\Delta'$, the stored data stream $f'_i(t+\Delta')$.

In particular, the data stream $f_i$ subsequently reproduced with a time-shift as a function of the stored time-shift duration $\Delta'_j$ is a data stream from among the following data streams:
- the first stored transmitted data stream $f'_1$;
- the second stored transmitted data stream $f'_2$, separate from the first data stream $f_1$;
- a third stored transmitted data stream $f'_3$, separate from the first and second streams $f_1$, $f_2$.

In particular, the command rcmd($f_i)_{i=1 \ldots n}$ for reproducing a data stream triggering time-shifted playback FRDD triggers reading of the time-shift duration ΔRD, which provides the time-shifted playback FRDD with the stored reproduction time-shift duration $\Delta'=\Delta'_j$. Notably, reading the time-shift duration ΔRD involves searching a time-shift database for the stored reproduction time-shift duration $\Delta'=\Delta'_j$, for example, as a function of the data stream $f_i$ of the reproduction command rcmd($f_i$). Optionally, reading the time-shift duration ΔRD modifies the reproduction command rcmd($f_i$) by integrating the read time-shift duration $\Delta'_j$ therein and supplies the time-shifted playback FRDD with the modified reproduction command rcmd($f_i,\Delta'_j$).

In particular, the time-shifted playback requests req($f_i,\Delta'_j$) the data stream $f_i$ of the reproduction command rcmd($f_i$) from a stream database BDF with a time time-shift equal to the stored time-shift $\Delta'_j$, notably read by reading the time-shift duration ΔRD.

The stream database BDF is a database in which at least one transmitted data stream is stored, including the first data stream. In the first use case above, the second transmitted data stream is also stored in the stream database BDF. In the second use case above, a third transmitted data stream is stored in the stream database BDF in addition to the first stream, or even to the second stream.

Thus, time-shifted playback retrieves, from the stream database, the stored data stream $f_i(t+\Delta'_j)$ corresponding to the data stream for which reproduction has been commanded rcmd(fi), with a time-time-shift as a function of the stored time-shift duration $\Delta'_j$.

A particular embodiment of the method for controlling reproduction of transmitted data streams is a program comprising program code instructions for executing the steps of the control method RPRC, notably as illustrated in FIG. 1a, 1b or 2, when said program is executed by a processor.

FIG. 3 illustrates a simplified diagram of a reproduction control device according to the invention.

The reproduction control device 10, 60 controls a device for reproducing a transmitted data stream $f_j$ including at least one first transmitted data stream $f_1$ and one second data stream $f_2$. The first stream $f_1$ and the second stream $f_1$ are separate streams. At least one data stream, including the first transmitted data stream, is stored in a stream memory 11, 61 for a predetermined remanence duration. The control device 10, 60 comprises a time-shift memory 1044. The time-shift memory 1044 stores, during a command rcmd($f_k$) for reproducing a second data stream, a reproduction time-shift duration $\Delta_j$ for a first stored data stream $f'_j$ that is being reproduced.

In particular, the reproduction control device 10, 60 comprises the stream memory 11, 61.

In particular, the reproduction control device 10, 60 comprises a stream player 102 in the stream memory 11, 61.

In particular, the stream player 102 sends the stream $f_j$, $f_k$, $f_i$ whose reproduction has been commanded rcmd($f_j$), rcmd ($f_k$), rcmd($f_i$) to the reproduction device 4. Notably, the stream player 102 requests the stream $f_j$, $f_k$, $f_i$ whose reproduction has been commanded rcmd($f_j$), rcmd($f_k$), rcmd($f_i$) from the stream memory 11, 61 before delivering it to the reproduction device 4.

In particular, the reproduction control device 10, 60 comprises a recorder 1043 for recording a reproduction time-shift duration in a time-shift memory 1044, notably in a time-shift database comprising at least one reproduction time-shift duration possibly associated with an identifier of the stream that is being reproduced in a time-shifted feed. Thus, when the time-shift database comprises several reproduction time-shift durations, the origin of the time-shift duration is easily identifiable and the use of this original stream, for a subsequent reproduction, time-shifted from the recorded time-shift duration allows the reproduction of the stream to be reproduced where it had been stopped by a change in stream reproduced when the original stream was reproduced in a time-shifted feed.

In particular, the reproduction control device 10, 60 comprises a reader 1045 for reading a reproduction time-shift duration in the time-shift memory 1044. The time-shift duration reader is triggered by a command rcmd($f_k$), rcmd ($f_i$) for reproducing a data stream. The time-shift duration reader provides the stream player 102 with the reproduction time-shift duration $\Delta'_j$ to be used or the instant 13.t+$\Delta'_j$ from which the stream $f_k$, $f_i$ must be played back.

In particular, the reproduction control device 10, 60 comprises an interaction command receiver/sensor 1042 receiving an interaction command 9. $ir_1$_rsp, $rsp_1$, 12. $ir_2$_rsp, $rsp_2$, with the interaction command notably comprising a response to an interaction proposal 9. $ir_1$_rsp, 12. $ir_2$_rsp.

The interaction command 9. $ir_1$_rsp, $rsp_1$, 12. $ir_2$_rsp, $rsp_2$ notably originates from:
- a sensor 100, 1042 implemented in the reproduction control device 10, 60, such as a voice sensor able to recognize, from the words spoken by the user U, either the positive response or a time-shifted conservation command, etc., a motion sensor able to recognize, from the gestures of the user U, either the positive response, or a time-shift conservation command, or a propagation command for the time-shift, or the designation of a command proposed from among several reproduced commands notably corresponding to a positive response to the interaction proposal or a time-shift conservation command, etc.; and/or a receiver 100, 1042 for receiving a command originating from a control device 2, such as a remote control, a terminal (notably a smartphone, a smart watch, etc.) connected to the control device 10, 60 and/or to the reproduction device 4.

In particular, the reproduction control device 10, 60 comprises an analyzer 1043 able to check the interaction command and to trigger the recorder 1043 as a function of the interaction command 9. $ir_1\_rsp$, $rsp_1$, notably if the response to the interaction proposal is positive or if the interaction command is a time-shift conservation command.

In particular, the reproduction control device 10, 60 comprises an analyzer 1042 able to check the interaction command and to trigger the time-shift duration reader 1045 or the stream player 102 as a function of the interaction command 12. $ir_2\_rsp$, $rsp_2$, notably if the response to the interaction proposal is positive or if the interaction command is a time-shift propagation command.

In particular, the reproduction control device 10, 60 comprises a reproducer/transmitter 1041 able to either reproduce or send a reproduction device 4 an interaction proposal 8. $ir_1$, 11. $ir_2$. The interaction proposal 8. $ir_1$, 11. $ir_2$ is notably provided by an interaction proposal generator 1040.

In particular, the control device 10, 60 comprises a time-shift conservation/propagation device 104. The time-shift conservation/propagation device 104 notably comprises one or more of the devices from among the following devices:
  a time-shift recorder 1043;
  a time-shift memory 1044;
  a time-shift reader 1045;
  a time-shift stream player (not illustrated);
  an interaction command receiver/sensor 1042, the receiver/sensor comprising at least one receiver and/or at least one interaction command sensor;
  an interaction command analyzer 1042;
  an interaction proposal transmitter/reproducer 1041, the transmitter/reproducer comprising either a transmitter intended for a reproduction device 4, or at least one reproducer of interaction proposals (a reproducer is notably understood to mean a screen, a loudspeaker, etc.);
  an interaction proposals generator 1040, etc.

It should be noted that a device 1042 for processing interaction commands as illustrated in FIG. 3 comprises an interaction command receiver/sensor and/or an interaction command analyzer.

In particular, the control device 10, 60 comprises a control interface 100 comprising at least:
  a sensor, such as a voice sensor able to recognize a specific command from the words spoken by the user U, a motion sensor able to recognize a specific command from the gestures of the user U, namely the designation of a command proposed from among several reproduced commands, etc.; and/or
  at least one command receiver for notably receiving commands from a control device 2, such as a remote control, a terminal (notably a smartphone, a smart watch, etc.) connected to the control device 10, 60 and/or to the reproduction device 4.

Optionally, the analyzer 1042 receives, from a control interface 100, the interaction commands 9. $ir_1\_rsp$, $rsp_1$, 12. $ir_2\_rsp$, $rsp_2$, 2. $ir_2\_rsp$, $rsp_2$ received and/or captured by the control interface 100.

In particular, the control device 10, 60 comprises a stream selector 101 able to retrieve the stream associated with the reproduction command 1. $rcmd(f_j)$, 7. $rcmd(f_k)$, 10.$rcmd(f_i)$ from the stream memory 11, 61. In particular, the stream player 102 receives, from the stream selector 101, an address in the stream memory 11, 61 that can be played back by the stream associated with the reproduction command 1. rcmd $(f_j)$, 7. $rcmd(f_k)$, 10.$rcmd(f_i)$. In the event that the stream player 102 does not receive a reproduction time-shift duration, the stream player 102 plays back the commanded stream as a live feed, i.e., the data of the stream corresponding to the current instant t: 2d. $f_j(t)$.

In particular, the control device 10, 60 comprises a time-shift device 103. The time-shift device 103 provides the stream player 102 with a time-shift duration $\Delta_j$ or the instant $6a"t+\Delta_j$ from which the stream $f_j$ must be played back as a function of one or more time-shift commands 3.tscmd.

In particular, the time-shift device 103 comprises a time-shift control analyzer 1030. Either the device 1030 is a device for processing time-shift commands, as illustrated in FIG. 3, comprising a time-shift command 3.tscomd receiver/sensor and/or a time-shift command analyzer, or the time-shift control analyzer receives the time-shift commands 3.tscomd from the control interface 100.

In particular, the analyzer 1030 triggers one or more devices as a function of the time-shift command 3 tscmd. For example, the analyzer 1030 checks whether the time-shift command corresponds to an action, notably an action from among the following actions:
  [rd] an action involving playing back the stream from the instant on the stream when the preceding action stopped;
  [ps] an action involving pausing playback of the stream at the instant on the stream when the preceding action stopped;
  [mv] an action involving forwarding or rewinding at a given speed on the stream from the instant on the stream when the preceding action stopped.

In the event that the analyzer 1030 determines that no time-shift action has been commanded or that the time-shift command tscmd commands returning to a live feed, then the analyzer 1030 determines that no action is commanded [N] and commands the stream player 102 to play back the live stream $f'_j(t)$ in order to deliver it to a reproduction device 4.

In the event that the analyzer 1030 determines a pause action [ps], the analyzer 1030 triggers, 3'.tscmd(ps), a pause controller 1031 commanding, on the stream player 102, pausing 4'a.psrd playback of the stream, such that the stream player only provides the retrieved/read datum $f'_j(t_{ps})$ corresponding to the instant of the stream when the pause action $t_{ps}$ is triggered on the reproduction device 4, and, in particular, the start tst of the timer 1032 measuring the duration for pausing playback of the stream $\Delta_{ps}$.

In the event that the analyzer 1030 determines a fast-forward or fast-rewind action [mv], the analyzer 1030 triggers 1033 fast playback of the stream with a predefined speed m (positive in the case of fast-forwarding and negative in the case of fast-rewinding) from the triggering instant $t_{mv}$ and supplies the retrieved/read data $f'_j(t_{mv}+m(t-t_{mv}))$ for the reproduction FRPR.

In the event that the analyzer 1030 determines a playback action [rd], the analyzer 1030 triggers a stop controller 1034 using a stop command 4"a.stpcmd, 4"b.stpcmd for stopping devices previously activated by the analyzer 1030, notably the timer 1032 and the fast stream player 1033. The stop controller notably retrieves the following as a function of the preceding action: pause [ps], fast playback [mv], respectively, the pause instant $t_{ps}$, and/or the pause duration $\Delta_{ps}$, the instant of the stream played back during fast playback when stopping fast playback $t_{mv}$, and supplies the stream player 102 with the instant from which the stream is to be played back as a function of the retrieved instants: respectively from the pause instant $t_{ps}$ and from the instant for stopping fast playback $t_{mv}$ or the reproduction time-shift duration $\Delta_j$ corresponding to the pause duration $\Delta_{ps}$ or the time gap between the current instant t and the instant reproduced before stopping the preceding action, respectively $t_{ps}$, $t_{mv}$.

In particular, the time-shift device 103 then comprises, before the stream player 102, a computer 1035 for computing the reproduction time-shift duration $\Delta_j$ corresponding to the pause duration $\Delta_{ps}$ or the time gap between the current instant t and the instant reproduced before stopping the preceding action, respectively $t_{ps}$, $t_{fr}$.

Thus, the stream player 102 provides the reproduction device 4 with the data stream to be reproduced $f_j(t+\Delta_j)$ with a time-shift corresponding to the reproduction time-shift due to the preceding action.

Using the example of a user U using a remote control 2 to initially control playback of a first data stream $f_j$. The stream reproduction command 1.rcmd($f_j$) is received or captured by the control device 10, 60, notably by the control interface 100 of the control device 10, 60. The stream $f_j$ whose reproduction has been commanded is played back as a live feed $f_j(t)$, i.e., without a reproduction time-shift relative to the stream transmitted in the stream memory 11, 61. In particular, a stream selector 101 receiving the reproduction command 1.rcmd($f_j$) requests the address of the stream 2a.add_$f_j$ in the stream memory 11, 61, which responds with the corresponding address 2b.$f_j$_add transmitted by the stream selector 101 to the stream player 102.

In particular, the stream player 102 plays back the stream as a live feed 2d.$f_j(t)$ commanded by the reproduction command, notably at the address in the memory 11, 61 provided by the stream selector 101. The stream player 102 then provides 2e.$f_j(t)$ the reproduction device 4 with the stored stream played back as a live feed.

The user U commands 3.tscmd, by means of their remote control 2, a time-shift of the stream $f_j$ that is being reproduced. The time-shift device 103 controls, as a function of the time-shift command 3.tscmd, one or more devices of the time-shift device. In particular, the analyzer 1030 initially determines the type of time-shift command 3'.tscmd(ps), 3".tscmd(mv), 3'".tscmd(rd), etc., and triggers a corresponding device, respectively the pause controller 1031, a fast reader 1034 and a stop controller 1034.

Thus, when the triggered device is the pause controller 1031, said controller commands 4'a.psrd a pause of playback on the stream player 102. The stream player does not read other data after reading the datum $f_j(t_{ps})$ corresponding to the instant $t_{ps}$ at which the pause action was triggered by the time-shift device 103 and that it sends to the reproduction device 4. Optionally, the pause controller 1031 further controls the start-up 4'b.stomd of the pause duration timer 1032.

When the triggered device is the fast reader 1033, said reader provides the stream player 102 with the next instant $t_{mv}$ to be played back in the stream memory. This next instant in fast playback $t_{mv}$ corresponds to a past or future instant relative to the current instant, it is computed by the fast reader 1033 as a function of a predetermined speed m. The stream player 102 then plays back 4'''d. $f_j(t_{mv})$ the fast-forward or rewind stream according to the predetermined playback speed m, notably provided by the time-shift command 3.tscmd, and provides the stream reproduction device 4 with the fast playback stream 6'''e. fj($t_{mv}$). The read time $t_{mv}$ corresponds to the initial fast playback time tmO, to which is added or subtracted, depending on whether the playback speed is negative (fast-rewind) or positive (fast-forward), a duration that is a multiple of the playback speed m and optionally of the difference between the current instant and the initial fast playback instant. For example, $t_{mv}=t_{m0}+m(t-t_{m0})$. The reproduction time-shift duration is then equal to $\Delta_m=t-t_{mv}=t-(t_{m0}+m(t-t_{m0}))$.

When the triggered device is the stop controller 1034, said controller commands the other devices of the time-shift device 103 to stop, notably command 4'''b. stpcmd of the timer 1032, command 4'''a. stpcmd of the fast reader 1033. The stop controller 1034 retrieves, notably, from the timer 1032, for example, the pause duration 5'''b. $\Delta_{ps}$, or, from the fast reader 1033, for example, 5'''a.tmv, $\Delta_m$ the instant of the stream played back during fast playback when fast playback $t_{mv}$ or the corresponding reproduction time-shift duration $\Delta_m$ is stopped.

In particular, the computer 1035 computes the reproduction time-shift duration $\Delta_j$ as a function of the retrieved values, notably of the pause duration 5'''b. $\Delta_{ps}$, or of the instant of the stream played back during fast playback when fast playback is stopped or of the corresponding reproduction time-shift duration 5'''a.tmv, $\Delta_m$ and provides the stream player 102, 6'''a.t+$\Delta_j$ with the instant from which the stream is to be played back as a function of the reproduction time-shift duration generated by the subsequent time-shift commands.

The stream player 102 then carries out time-shifted playback 6'''d. $f_j(t+\Delta_j)$ of the stream and supplies the stream reproduction device 4 with the time-shifted stream 6'''e. $f_j(t+\Delta_j)$.

FIGS. 4a to 4c show several embodiments of a communication architecture comprising the reproduction control device according to the invention.

FIG. 4a illustrates a simplified diagram of a first embodiment of a communication architecture comprising a reproduction control device 10, 60, according to the invention, in which the data streams are received by a data stream decoder 1 connected to a television 4 and optionally recorded in a network recorder 6.

The user U notably carries out an action a on a remote control 2, which sends a command cmd, notably a stream reproduction command rcmd(fj), a time-shift command tscmd, to a reproduction device 4 and/or to a data stream decoder 1.

A broadcast or transmission source 3 sends data streams $\{f_l\}_{l=1 \ldots n}$ via a network 5, for example, a broadcast network or a wired communication network (adsl, optical fiber) or mobile communication network (4G, 5G, etc.), to the reproduction device 4.

In particular, the reproduction device 4 is locally connected to a data stream decoder 1 comprising a stream receiver able to receive the data streams from the source 3 and a transmitted data stream selector, with the selector providing the reproduction device 4 with a selected data stream $f_j$ as a function of the received reproduction command rcmd($f_j$). Depending on the type of connection between the data stream decoder 1 and the reproduction device 4, the data stream decoder 1 optionally comprises a transmitter able to send the reproduction device 4 the data stream selected by the decoder TV1 from among the received data streams $\{f_l\}_{l=1 \ldots n}$.

In particular, the communication architecture further comprises a network recorder 6 remote from the reproduction device 4. The network recorder 6 notably comprises a stream memory or database 61, in which at least one data stream transmitted by the source 3 via the network 5 is recorded for a remanence duration. The network recorder 6 is connected to the source 3 either locally or remotely via a communication network, notably the network 5. In the event that the source 3 is a broadcast source, the network recorder 6 comprises a receiver of data streams broadcast via the network 5. In particular, the network recorder 6 comprises a stream recorder (not illustrated) writing the data of at least one data stream transmitted by the source 3 in the stream database. The stream database 61 is notably formed by a FIFO (First In First Out) type stack long enough to allow the data of a stream to be recorded over a predetermined remanence duration. Thus, the stream database 61 of the network recorder 6 only retains the data of the at least one data stream transmitted during the instants tp preceding the current instant t included in the remanence duration $T_R$, tp ⊃ [t, t−$T_R$].

In a first particular embodiment, the data stream decoder 1 comprises:
- a reproduction control device 10 connected to a network recorder 6 via a communication network, notably the communication network 5 connecting the source 3 to the decoder 1, the reproduction control device 10 comprises:
  - a time-shift transmitted data stream selector 101, the time-shift selector 101 sending a reproduction device 4 connected to the data stream decoder 1 a selected stored data stream $f'_j(t)$, called first data stream, originating from the network recorder 6;
  - a time-shift memory storing, during a command for reproducing a second data stream, a reproduction time-shift duration for a first stored data stream that is being reproduced.

In particular, the time-shift selector 101 of the reproduction control device 10 of the decoder 1 requests the selected data stream $f_j$ from the network recorder 6, which reads, in its stream database 61, the selected stored data stream $f_j(t)$ in order to deliver it to the decoder 1.

In particular, the reproduction control device 10 of the decoder 1 comprises a data stream player/receiver 102 (see FIG. 3) able to receive at least the selected stored data stream from the network recorder 6 and to deliver it to the reproduction device 4.

In particular, the reproduction control device 10 of the decoder 1 comprises, at the output of the data stream player/receiver 102, a stream transmitter (not illustrated) transmitting the first stored stream to the reproduction device 4.

In particular, the decoder control device comprises a time-shift propagation device 104 able to command the stream player 102 to play back the stream $f_k$, $f_i$ indicated in a stream reproduction command rcmd($f_k$), rcmd($f_i$) with a time-shift as a function of the time-shift duration Δ stored in the time-shift memory 1044, for example, $f'_k(t+Δ')$, $f'_i(t+Δ')$.

In particular, the reproduction control device 10 of the decoder 1 comprises:
- a data stream receiver 12 (not illustrated) able to receive the data streams transmitted by a remote stream source 3;
- a live data stream selector 13 (not illustrated) able to select a stream from among the received transmitted data streams; and
- a controller 14 able to trigger the time-shift stream selector 101 during a time-shift command tscmd or during a stream reproduction command rcmd($f_k$), rcmd ($f_i$) if the data stream that is being reproduced is a stored data stream.

In a second particular embodiment, the data stream decoder 1 comprises a controller 14 able to intercept the command and to trigger the transmission of commands originating from a control terminal 2 to a network recorder 6 as a function of the type of command. Notably, the controller 14 transmits the command to the network recorder 6 when the command is a time-shift command tscmd, or a stream reproduction command rcmd($f_k$), rcmd($f_i$), while the data stream that is being reproduced is a stored data stream. Thus, the stream reproduction command rcmd($f_k$), rcmd($f_i$) will not be processed by the selector 13 of the stream decoder 1 to select a data stream transmitted directly by the source 3 to the decoder 1, but will be provided by the network recorder 6 in order to select a data stream stored in the stream memory 61 originating from the source 3.

In particular, the data stream decoder comprises a stored stream receiver 15 (not illustrated) able to receive at least the selected stored data stream read by the network recorder 6 and to deliver it to the reproduction device 4.

In particular, the reproduction control device 10 of the decoder 1 comprises, at the output of the stored data stream receiver 15, a stream transmitter (not illustrated) transmitting the first stored stream to the reproduction device 4.

The network recorder 6 then comprises a stream memory 61 storing the data streams for a predetermined remanence duration $T_R$.

In particular, the network recorder 6 comprises a reproduction control device 60 comprising a time-shift memory 6044 storing, during a command rcmd($f_k$), rcmd($f_i$) for reproducing a second data stream, a reproduction time-shift duration Δ for a first stored data stream $f_j$ that is being reproduced. Notably, the network recorder 6 comprises a stream player 602 able to read the stream memory 61 and to supply a remote reproduction device 4 with a stored data stream $f_j(t)$ selected as a function of the stream selection command rcmd($f_j$) received from the decoder 1.

In particular, the network recorder 6 comprises a receiver 600 for controlling the selection of streams originating from the decoder 1.

In particular, the reproduction control device 60 comprises a time-shift selector 601, which requests the selected data stream $f_j$ from the stream player 602, which reads, in its stream database 61, the selected stored data stream $f_j(t)$ in order to deliver it to the decoder 1.

In particular, the stream player 602 of the network recorder 6 is able to send the decoder 1 a stored data stream stored with a time-shift as a function of the stored time-shift duration $f_j(t+Δ)$.

In particular, the control device 60 of the network recorder 6 comprises a time-shift propagation device 603 able to command the stream player 602 to read the stream $f_k$, $f_i$ indicated in a stream reproduction command rcmd($f_k$), rcmd ($f_i$) with a time-shift as a function of the time-shift duration Δ stored in the time-shift memory 6044, for example, $f'_k(t+Δ')$, $f'_i(t+Δ')$.

In particular, the reproduction control device 60 of the recorder comprises:
- a data stream receiver 62 (not illustrated) able to receive the data streams transmitted by a remote stream source 3;
- a stream recorder 66 (not illustrated) able to write the data of at least one data stream transmitted by the source 3 in the stream memory or the stream database 61.

Thus, irrespective of the particular embodiment, the source transmits several data streams {$f_l$} via the network 5. The data streams {$f_l$} are received by the decoder 1, and/or the reproduction device 4, and the network recorder 4.

Firstly, the user U commands cmd, via an action a on their control interface 2, a reproduction rcmd($f_j$) of a first stream.

The control interface 2 transmits the command either to the reproduction device 4 or to the decoder 1.

The reproduction device 4, if it receives the data streams, or the decoder 1 receiving the reproduction command selects, by means of its stream selector 101, the stream $f_j$ whose reproduction is commanded by the received command rcmd(fj) from the transmitted data streams $\{f_i\}$ and, in the event that the selector 101 is implemented in the decoder 1, delivers it to the reproduction device 4, which reproduces the selected transmitted stream $f_j(t)$ as a live feed.

Secondly, optionally, the user U commands cmd, via at least one action a on its control interface 2, a time-shift tscmd on the stream that is being reproduced, in this case the first stream $f_j$. The control interface 2 transmits the command to the decoder 1, which, in the first particular embodiment, comprises a control device 10 able to process the time-shift command tscmd, and, in the second particular embodiment, comprises a transmitter for transmitting commands to a network recorder 6 able to process the time-shift command tscmd.

The control device 10 of the decoder 1, in the first particular embodiment, or the control device 60 of the network recorder, in the second particular embodiment, reads/receives the first stream stored in the stream memory 61 of the network recorder 6 in order to provide the stored data stream $f'_j$ corresponding to the first time-shifted stream $f'_j(t+\Delta)$ with a reproduction time-shift duration $\Delta$ as a function of the time-shift command tscmd. For example, in the case of a time-shift command corresponding to a pause playback action, the time-shift duration $\Delta$ corresponds to the difference between the current instant t and the instant at which the pause action was implemented by the control device 10, 60; in the case of a subsequent playback action (i.e., after a first time-shift action such as a pause action), the time-shift duration $\Delta$ corresponds to the difference between the instant at which the subsequent playback action was implemented by the control device 10, 60 and the instant at which the pause action was implemented by the control device 10, 60; etc.

In particular, the control device 10, 60 implements a time-shift device 103 able to provide the player 102, 602 with the playback instant $t+\Delta$ integrating the reproduction time-shift duration as a function of the time-shift command tcmd.

Thirdly, while the first stream $f_j$ is being reproduced as a live feed $f_j(t)$ or as a time-shifted feed $f'_j(t+\Delta)$, the user U commands cmd, via an action a on their control interface 2, a reproduction of a second stream rcmd($f_k$). The control interface 2 transmits the command either to the reproduction device 4 or to the decoder 1. In particular, if the stream that is being reproduced is a stored data stream, the reproduction command of the second stream will be processed by the decoder 1.

The control device 10 of the decoder 1, in the first particular embodiment, or the control device 60 of the network recorder, in the second particular embodiment, records, in its time-shift memory 1044, 6044 the time-shift duration $\Delta$ of the stored data stream that is being reproduced $f'_j(t+\Delta)$, optionally as a function of a first interaction rps1, i1_rsp (see FIG. 1b) of the user U.

In particular, the control device 10 of the decoder 1, in the first particular embodiment, or the control device 60 of the network recorder, in the second particular embodiment, reads/receives the second stream stored in the stream memory 61 of the network recorder 6 in order to provide the stored data stream $f'_k$ corresponding to the second stream as a live feed $f'_k(t)$ or as a time-shifted feed $f'_k(t+\Delta')$ with a stored reproduction time-shift duration $\Delta'$. Playing back the second stream as a live feed or as a time-shifted feed is notably a function of a second interaction rps2, i2_rsp (see FIG. 1b) of the user U. In the case of time-shifted playback, the propagation device 104, 604 provides the stream player 102, 602 with the reproduction time-shift duration $\Delta'$ stored in the time-shift memory 1044, 6044.

In particular, the propagation device 104, 604 implements the time-shift memory 1044, 6044.

Fourthly, optionally, the user U commands cmd, via at least one action a on their control interface 2, a time-shift tscmd on the stream that is being reproduced as a live feed or as a time-shifted feed, in this case the second stream $f_k$. The control interface 2 transmits the command to the decoder 1, which, in the first particular embodiment, comprises a control device 10 able to process the time-shift command tscmd, and, in the second particular embodiment, comprises a transmitter for transmitting commands to a network recorder 6 able to process the time-shift command tscmd.

The control device 10 of the decoder 1, in the first particular embodiment, or the control device 60 of the network recorder, in the second particular embodiment, reads/receives the first stream stored in the stream memory 61 of the network recorder 6 in order to provide the stored data stream $f'_j$ corresponding to the second time-shifted stream $f'_k(t+\Delta k)$ with a reproduction time-shift duration $\Delta_k$ as a function of the time-shift command tscmd and of the optional propagated time-shift duration $\Delta'$.

Fifthly, optionally, while the second stream $f_k$ is being reproduced as a live feed $f_k(t)$ or as a time-shifted feed $f'_k(t+\Delta')$, $f'_k(t+\Delta_k)$, the user U commands cmd, via an action a on their control interface 2, a reproduction of a new stream rcmd($f_i$), for example, a third stream or the first stream i=j again. The control interface 2 transmits the command either to the reproduction device 4 or to the decoder 1. In particular, if the stream that is being reproduced is a stored data stream, the reproduction command of the second stream will be processed by the decoder 1.

In particular, notably if the time-shift duration is not already stored ($\Delta'$ is already stored but not $\Delta_k$), the control device 10 of the decoder 1, in the first particular embodiment, or the control device 60 of the network recorder, in the second particular embodiment, records, in its time-shift memory 1044, 6044, the time-shift duration $\Delta_k$ of the stored data stream $f'_k(t+\Delta_k)$ that is being reproduced, optionally as a function of a first interaction rps1, i1_rsp (see FIG. 1b) of the user U.

In particular, the control device 10 of the decoder 1, in the first particular embodiment, or the control device 60 of the network recorder, in the second particular embodiment, reads/receives the new stream stored in the stream memory 61 of the network recorder 6 in order to provide the stored data stream $f'_i$ corresponding to the new stream as a live feed $f'_k(t)$ or as a time-shifted feed $f'_i(t+\Delta')$, $f'_i(t+\Delta'k)$, with a stored reproduction time-shift duration $\Delta'$, $\Delta_k$. Playing back the second stream as a live feed or as a time-shifted feed is notably a function of a second interaction rps2, i2_rsp (see FIG. 1b) of the user U.

FIG. 4b illustrates a simplified diagram of a second embodiment of a communication architecture comprising the reproduction control device 10 according to the invention, in which the data streams are received by a data stream decoder 1 connected to a television 4 and integrating the control device according to the invention.

The user U notably carries out an action a on a remote control 2, which sends a command cmd, notably a stream reproduction command rcmd(f), a time-shift command tscmd, to a reproduction device 4 and/or to a data stream decoder 1.

A broadcast or transmission source 3 sends data streams $\{f_l\}_{l=1\ldots n}$ via a network 5, for example, a broadcast network or a wired communication network (adsl, optical fiber) or a mobile communication network (4G, 5G, etc.), to the reproduction device 4.

In particular, the reproduction device 4 is locally connected to a data stream decoder 1 comprising a stream receiver able to receive the data streams from the source 3 and a transmitted data stream selector, with the selector providing the reproduction device 4 with a selected data stream $f_j$ as a function of the received reproduction command rcmd($f_j$). Depending on the type of connection between the data stream decoder 1 and the reproduction device 4, the data stream decoder 1 optionally comprises a transmitter able to send the reproduction device 4 the data stream that is selected by the decoder TV1 from among the received data streams $\{f_l\}_{l=1\ldots n}$.

In particular, the decoder 1 notably comprises a stream database 11, in which at least one data stream transmitted by the source 3 via the network 5 is recorded for a remanence duration. Notably, the decoder 1 forms or implements a personal recorder or personal video recorder (PVR). In the event that the source 3 is a broadcast source, the decoder 1 comprises a receiver of data streams broadcast via the network 5. In particular, the decoder 1 comprises a stream recorder (not illustrated) writing the data of at least one data stream transmitted by the source 3 in the stream database. The stream database 11 is notably formed by a FIFO (First In First Out) type stack long enough to allow the data of a stream to be recorded over a predetermined remanence duration $T_R$.

In particular, the data stream decoder 1 comprises:
a reproduction control device 10 connected to the stream memory 11, the reproduction control device 10 comprises:
a time-shift transmitted data stream selector 101, the time-shift selector 101 sending a reproduction device 4 connected to the data stream decoder 1 a selected stored data stream $f'_j(t)$, called first data stream, originating from the stream memory 11;
a time-shift memory 1044 storing, during a command for reproducing a second data stream, a reproduction time-shift duration for a first stored data stream that is being reproduced.

In particular, the time-shift selector 101 of the reproduction control device 10 of the decoder 1 requests the selected data stream $f_j$ from a recorder implemented in the decoder, notably a personal recorder, which reads, in its stream database 11, the stored data stream $f_j(t)$ in order to deliver it to the decoder 1.

In particular, the reproduction control device 10 of the decoder 1 comprises a data stream player 102 (see FIG. 3) able to read at least the stored data stream selected from the stream memory 11 and to deliver it to the reproduction device 4.

In particular, the reproduction control device 10 of the decoder 1 comprises, at the output of the data stream player/receiver 102, a stream transmitter (not illustrated) transmitting the first stored stream to the reproduction device 4.

In particular, the decoder control device comprises a time-shift propagation device 104 able to command the stream player 102 to play back the stream $f_k$, $f_i$ indicated in a stream reproduction command rcmd($f_k$), rcmd($f_i$) with a time-shift as a function of the time-shift duration $\Delta$ stored in the time-shift memory 1044, for example, $f'_k(t+\Delta')$, $f'_i(t+\Delta')$.

In particular, the reproduction control device 10 of the decoder 1 comprises:
a data stream receiver 12 (not illustrated) able to receive the data streams transmitted by a remote stream source 3;
a live data stream selector 13 (not illustrated) able to select a stream from among the received transmitted data streams; and
a controller 14 able to trigger the time-shift stream selector 101 during a time-shift command tscmd or during a stream reproduction command rcmd($f_k$), rcmd ($f_i$) if the data stream that is being reproduced is a stored data stream.

FIG. 4c illustrates a simplified diagram of a third embodiment of a communication architecture comprising the reproduction control device according to the invention, in which the data streams are received by a television 4 and optionally recorded in a network recorder 6.

The user U notably carries out an action a on a remote control 2, which sends a command cmd, notably a stream reproduction command rcmd(f), a time-shift command tscmd, to a reproduction device 4.

A broadcast or transmission source 3 sends data streams $\{f_l\}_{l=1\ldots n}$ via a network 5, for example, a broadcast network or a wired communication network (adsl, optical fiber) or a mobile communication network (4G, 5G, etc.), to the reproduction device 4.

In particular, the reproduction device 4 comprises a stream receiver able to receive the data streams from the source 3 and a transmitted data stream selector, also called live selector, with the selector providing, as a data stream to be reproduced, a data stream $f_j$ selected as a function of the received reproduction command rcmd($f_j$). The live data stream selector delivers the data streams to at least one elementary reproduction device 47, notably to at least one screen and/or at least one loudspeaker.

In particular, the communication architecture further comprises a network recorder 6 remote from the reproduction device 4. The network recorder 6 notably comprises a stream database 61, in which at least one data stream transmitted by the source 3 via the network 5 is recorded for a remanence duration. The network recorder 6 is connected to the source 3 either locally or remotely via a communication network, notably the network 5. In the event that the source 3 is a broadcast source, the network recorder 6 comprises a receiver of data streams broadcast via the network 5. In particular, the network recorder 6 comprises a stream recorder (not illustrated) writing the data of at least one data stream transmitted by the source 3 in the stream database. The stream database 61 is notably formed by a FIFO (First In First Out) type stack long enough to allow the data of a stream to be recorded over a predetermined remanence duration. Thus, the stream database 61 of the network recorder 6 only retains the data of the at least one data stream transmitted during the instants tp preceding the current instant t included in the remanence duration $T_R$, tp $\supset$ [t, t−$T_R$].

In a first particular embodiment, the reproduction device 4 comprises:
a reproduction control device 40 connected to a network recorder 6 via a communication network, notably the communication network 5 connecting the source 3 to the reproduction device 4, the reproduction control device 40 comprises:

a time-shift transmitted data stream selector 401, the time-shift selector 401 delivering, as a data stream to be reproduced, a selected stored data stream f'$_j$(t), called first data stream, originating from the network recorder 6;

a time-shift memory 4044 storing, during a command for reproducing a second data stream, a reproduction time-shift duration for a first stored data stream that is being reproduced.

The time-shift data stream selector 401 delivers the data streams to at least one elementary reproduction device 47, notably to at least one screen and/or to at least one loudspeaker.

In particular, the time-shift selector 401 of the reproduction control device 40 of the reproduction device 4 requests the selected data stream f$_j$ from the network recorder 6, which reads, in its stream database 61, the selected stored data stream f$_j$(t) in order to deliver it to the reproduction device 4.

In particular, the reproduction control device 40 of the reproduction device 4 comprises a data stream player 402 (see FIG. 3) able to read at least the stored data stream selected from the network recorder 6 and to deliver it to the elementary reproduction device 47.

In particular, the control device 40 of the reproduction device 4 comprises a time-shift propagation device 404 able to command the stream player 402 to playback the stream f$_k$, f$_i$ indicated in a stream reproduction command rcmd(f$_k$), rcmd(f$_i$) with a time-shift as a function of the time-shift duration Δ stored in the time-shift memory 4044, for example, f'$_k$(t+Δ'), f'$_i$(t+Δ').

In particular, the reproduction control device 40 of the reproduction device 4 comprises:

a data stream receiver 42 (not illustrated) able to receive the data streams transmitted by a remote stream source 3;

a live data stream selector 43 (not illustrated) able to select a stream from among the received transmitted data streams; and a controller 44 able to trigger the time-shift stream selector 401 during a time-shift command tscmd or during a stream reproduction command rcmd(f$_k$), rcmd (f$_i$) if the data stream that is being reproduced is a stored data stream.

In another embodiment equivalent to the second embodiment of FIG. 4a, the time-shift memory 6044 is implemented in the network recorder. In particular, the network recorder 6 implements a control device 60 similar to that described in the second embodiment of FIG. 4a. In this case, the reproduction device 4 optionally comprises a controller 44 able to intercept the command and to trigger the transmission of commands originating from a control terminal 2 to a network recorder 6 as a function of the type of command. In addition, in particular, the reproduction control device 40 of the reproduction device 4 comprises, at the output of a stored data stream receiver 45, a stream transmitter (not illustrated) transmitting the first stored stream to the elementary reproduction device 47.

In another embodiment (not illustrated) equivalent to that of FIG. 4b, the network architecture only comprises the source 3 connected via the network 5 to the reproduction device 4, which comprises the stream memory 4. Notably, the reproduction device 4 comprises a personal recorder. Thus, the reproduction device 4 records at least one transmitted data stream from among the data streams transmitted by the source in the stream memory during a predetermined remanence duration.

FIGS. 5a and 5b show several use cases of the invention by way of an example and in a non-exhaustive manner.

FIG. 5a illustrates a simplified diagram illustrating a first use case of the invention, in which the time-shift Δ of a first stream f$_1$ is propagated over the next stream, namely a second stream f$_2$, as soon as the reproduction of the first stream has changed to the second stream.

At an instant t=t0, the user U watches a first transmitted data stream f$_1$(t), f'$_1$(t), notably by means of a first transmission channel C1 and that is reproduced as a live feed by a television 4.

In particular, a screen of the television 4 displays a live feed of the images of the first data stream f$_1$(t) transmitted by a broadcast source 3 or the images of the first data stream f'$_1$(t) stored in a stream memory 11, 41, 61 implemented in a decoder 1 connected to the television 4, or a network recorder 6 to which the television 4 is connected directly or via a decoder 1.

Optionally, the screen of the television 4 displays additional information such as:

the name of the television station chi corresponding to the transmission channel, in this case to the first broadcast channel C1, of the television station for which the data stream is reproduced;

information relating to the time-shift tsi, in this case at the instant t0, relating to the fact that the stream is reproduced as a live feed "drct".

At an instant t=tps, after t0, for example, due to a telephone call intended for the user U and received by means of a telephone 9, a time-shift command tscmd(ps), in this case a pause playback command, is transmitted by a control interface following a first action a1 of the user U relative to this control interface.

A device, notably a time-shift device 103, 403, 603 implemented in the device implementing the stream memory 11, 41, 61, respectively the decoder 1, the television 4 or the network recorder 6, suspends the reproduction of the stream as a live feed and requests that the elementary television reproduction device is provided with, notably on the screen, the image of the first data stream displayed during the first pause action a1.

At this instant tps, the screen of the television 4 displays, in particular, the image of the first stored data stream f'$_1$(tps) corresponding to this instant tps.

Optionally, the screen of the television 4 displays additional information such as:

the name of the television station chi corresponding to the transmission channel, in this case to the first broadcast channel C1, of the television station for which the data stream is reproduced;

information relating to the time-shift tsi, in this case at the instant to, relating to the fact that the reproduction of the stream is suspended, notably with an indicator of the instant of the reproduced stream, such as "tps" and/or with a symbol such as "II".

At an instant t=t1, after tps, in this example notably due to the end of the telephone call, a time-shift command tscmd(rd), in this case a resume playback command, is transmitted by a control interface following a second action a2 of the user U relative to this control interface.

The device, notably a time-shift device 103, 403, 603, resumes the reproduction of the stream as a time-shifted feed with a reproduction time-shift duration Δ as a function of the pause instant tps and of the resumption instant t1: Δ=tps−t1, Δ<0. and requests that the elementary reproduction device of the television is provided with, notably on the screen, the first stored data stream from the image of this first stream displayed during the first pause action a1.

At this instant t1, the screen of the television 4 displays, in particular, the first stored data stream $f'_1(t+\Delta)$ with a time-shift as a function of the reproduction time-shift duration $\Delta$.

Optionally, the screen of the television 4 displays additional information such as:
- the name of the television station chi corresponding to the transmission channel, in this case to the first broadcast channel C1 of the television station for which the data stream is reproduced;
- information relating to the time-shift tsi, in this case at the instant t1, relating to the fact that the reproduced stream is the first stored stream, time-shifted by the reproduction time-shift duration $\Delta$, notably with an indicator of the instant of the reproduced stream, such as "t1+$\Delta$".

At a subsequent instant t=t2, a reproduction command $\text{rcmd}(f_2)$ is transmitted by a control interface following a third action a3 of the user U relating to this control interface. This command requests a change in the reproduced stream, notably a television station in the example of FIG. 5a.

This reproduction command $\text{rcmd}(f_2)$ triggers the selection, by the decoder 1, the television 4 or the network recorder 6, of a second stored data stream $f_2$ separate from the first stream $f_1$ and then triggers the reproduction of this second stored data stream $f_2$ by the television.

A live control device 10, 40, 60 according to the invention, implemented in the device implementing or connected to the stream memory 11, 41, 61, respectively, the decoder 1, the television 4 or the network recorder 6, firstly records the reproduction time-shift duration $\Delta$ for the first stream $f_1$ in a time-shift memory 1044, 4044, 6044 and, in this example, propagates the reproduction time-shift duration $\Delta'$ to the second stream $f_2$.

The device, notably a conservation/propagation device 104, 404, 604, triggers playback of the second stream as a time-shifted feed with a stored reproduction time-shift duration $\Delta'$ corresponding to the reproduction time-shift duration $\Delta$ stored in the time-shift memory, and requests that the elementary reproduction device of the television is provided with, notably on the screen, the second stored data stream with a time-shift as a function of the reproduction time-shift duration $\Delta'$ stored during the third stream change action a3.

At this instant t2, the screen of the television 4 displays, in particular, the second stored data stream $f'_2(t_2+\Delta')$ with a time-shift as a function of the stored reproduction time-shift duration $\Delta'$.

Optionally, the screen of the television 4 displays additional information such as:
- the name of the television station chi corresponding to the transmission channel, in this case to the second broadcast channel C2 of the television station for which the data stream is reproduced;
- information relating to the time-shift tsi, in this case at the instant t2, relating to the fact that the reproduced stream is the second stored stream, time-shifted as a function of the reproduction time-shift duration $\Delta'$, notably with an indicator of the instant of the reproduced stream, such as "t2+$\Delta'$".

FIG. 5b illustrates a simplified diagram illustrating a second use case of the invention, in which the time-shift of the first stream is conserved and then again propagated to the first stream itself, after flicking over several streams before reproducing the first stream again.

At an instant t=t0, the user U watches a first stored transmitted data stream $f'_1(t+\Delta_1)$, notably by means of a first transmission channel C1 and reproduced as a time-shifted feed with a first-time-shift $\Delta_1$ by a reproduction device 4, notably a monitor or a television directly or indirectly connected via a communication network 5 to a data stream transmission server 3 forming a stream source. The first time-shift $\Delta_1$ notably results from one or more previous time-shift commands on a previously reproduced data stream, the first stream $f_1$ or another data stream $f_0$ separate from the first stream, the time-shift of which has been propagated to the first stream $f_1$, as illustrated in FIG. 5a for propagation to the second stream $f_2$.

In particular, a screen of the reproduction device 4 displays a time-shifted feed of the images of the first data stream $f'_1(t+\Delta_1)$ stored in a stream memory 11, 41, 61 implemented in a decoder 1 connected to the reproduction device 4, or a network recorder 6 to which the reproduction device is connected directly or via a decoder 1.

Optionally, the screen of the reproduction device 4 displays additional information such as:
- the name of the television station chi for which the data stream is reproduced, in this case relating to the first data stream of the first station C1;
- information relating to the time-shift tsi, in this case at the instant t0, relating to the fact that the stream is reproduced as a time-shifted feed with a first time-shift "t0+$\Delta_1$".

At an instant t=t1, after t0, a reproduction command $\text{rcmd}(f_2)$ is transmitted by a control interface following a first action a1 of the user U relative to this control interface. This command requests a change of the reproduced stream.

This reproduction command $\text{rcmd}(f_2)$ triggers the selection, by the decoder 1, the reproduction device 4 or the network recorder 6, of a second stored data stream $f_2$ separate from the first stream $f_1$ and then triggers the reproduction of this second stored data stream $f_2$ by the reproduction device.

A live control device 10, 40, 60 according to the invention, implemented in the device implementing or connected to the stream memory 11, 41, 61, respectively, the decoder 1, the reproduction device 4 or the network recorder 6, firstly records the reproduction time-shift duration $\Delta_1$ for the first stream $f_1$ in a time-shift memory 1044, 4044, 6044 and, in this example, does not propagate the reproduction time-shift duration $\Delta_1'$ to the second stream $f_2$, but reproduces it as a live feed.

In particular, a screen of the reproduction device 4 displays a live feed of the images of the second data stream $f_2(t)$ transmitted by the stream source 3 or the images of the second data stream $f'_2(t)$ stored in a stream memory 11, 41, 61 implemented in a decoder 1 connected to the reproduction device 4, or a network recorder 6 to which the reproduction device 4 is connected directly or via a decoder 1.

The device, notably a conservation/propagation device 104, 404, 604, triggers playback of the second stream as a live feed, and requests that the elementary reproduction device of the reproduction device is provided with, notably on the screen, the second transmitted $f_2(t)$ or stored $f'_2(t)$ data stream as a live feed.

At this instant t1, the screen of the reproduction device 4 displays, in particular, the second transmitted $f_2(t_1)$ or stored $f'_2(t_1)$ data stream with a time-shift as a function of the stored reproduction time-shift duration $\Delta'$.

Optionally, the screen of the reproduction device 4 displays additional information such as:
- the name of the television station chi for which the data stream is reproduced, in this case relating to the second data stream of the second station C2;

information relating to the time-shift tsi, in this case at the instant t1, relating to the fact that the stream is reproduced as a live feed "drct" and/or the reproduced instant "t1".

With the user U flicking over several data streams $f_2 \ldots f_{i-1}$, there is no reproduction time-shift on the reproduced streams, and, consequently, there is no conservation of the time-shift duration relative to these data streams.

In particular, at an instant ti, i=3 . . . I, after t2, a reproduction command $rcmd(f_{i-1})$ is transmitted by a control interface following an i−2th action ai−2 of the user U relative to this control interface. This command requests an i−1th change of the reproduced stream.

This reproduction command $rcmd(f_{i-1})$ triggers the selection, by the decoder 1, the reproduction device 4 or the network recorder 6, of a second stored data stream $f_2$ separate from the first stream $f_1$ and from the preceding stream $f_{i-2}$ and then triggers the reproduction of this i−1th stored data stream $f_{i-1}$ by the reproduction device.

In particular, a screen of the reproduction device 4 displays a live feed of the images of the i−1th data stream $f_1(t)$ transmitted by the stream source 3 or the images of the i−1th data stream $f'_{i-1}(t)$ stored in a stream memory 11, 41, 61 implemented in a decoder 1 connected to the reproduction device 4, or a network recorder 6 to which the reproduction device 4 is connected directly or via a decoder 1.

A device, notably a conservation/propagation device 104, 404, 604, triggers playback of the i−1th stream as a live feed, and requests that the elementary reproduction device of the reproduction device is provided with, notably on the screen, the i−1th transmitted data stream $f_{i-1}(t)$ or stored data stream $f'_{i-1}(t)$ as a live feed.

At this instant t1, the screen of the reproduction device 4 particularly displays the i−1th transmitted data stream $f_{i-1}(t)$ or stored data stream $f_{i-1}(t)$ as a live feed.

Optionally, the screen of the reproduction device 4 displays additional information such as:

the name of the television station chi for which the data stream is reproduced, in this case relating to the second data stream of the i−1th station Ci;

information relating to the time-shift tsi, in this case at the instant t1, relating to the fact that the stream is reproduced as a live feed "drct" and/or the reproduced instant "t1".

At a subsequent instant t=tn, a reproduction command $rcmd(f_1)$ is transmitted by a control interface following an n-th action $a_n$ of the user U relating to this control interface. This command requests a change in the reproduced stream, notably a television station in the example of FIG. 5a, in particular a return to the first stream $f_1$ reproduced at the instant t0.

This reproduction command $rcmd(f_2)$ triggers the selection, by the decoder 1, the reproduction device 4 or the network recorder 6, of the first stored data stream $f_1$ separate from the intermediate streams $f_{i-1, i=3 \ldots I}$ and then triggers the reproduction of this first stored data stream $f_1$ by the reproduction device.

A live control device 10, 40, 60 according to the invention, implemented in the device implementing or connected to the stream memory 11, 41, 61, respectively, the decoder 1, the reproduction device 4 or the network recorder 6, propagates, in this example, the reproduction time-shift duration $\Delta'$ of the first stored memory to the first stream $f_1$.

The device, notably a conservation/propagation device 104, 404, 604, triggers playback of the second stream as a time-shifted stream as a function of a stored reproduction time-shift duration $\Delta'_1$ corresponding to the reproduction time-shift duration $\Delta'$ stored in the time-shift memory, and requests that the elementary reproduction device of the reproduction device is provided with, notably on the screen, the second data stream stored with a time-shift as a function of the reproduction time-shift duration $\Delta'_1$ stored during the first stream change action a1.

At this instant tn, the screen of the reproduction device 4 displays, in particular, the first stored data stream $f'_1(t_n+\Delta)$ with a time-shift $\Delta$ as a function of the stored reproduction time-shift duration $\Delta'_1$. In particular, the time-shift duration $\Delta$ used to time-shift the reproduction of the first stream from the instant tn also takes into account the interruption duration $\Delta s$ of the reproduction of the first stream by flicking streams, i.e., successively changing streams, before returning to the first stream, $\Delta s=t0-tn$. For example, the time-shift duration $\Delta$ used to time-shift the reproduction of the first stream from the instant tn is equal to $\Delta=\Delta'_1+\Delta s$.

Optionally, the screen of the reproduction device 4 displays additional information such as:

the name of the television station chi for which the data stream is reproduced, in this case relating to the first data stream of the first station C1;

information relating to the time-shift tsi, in this case at the instant t1, relating to the fact that the stream is reproduced as a time-shifted feed with a first time-shift "tn+$\Delta$".

Consequently, the invention involves providing the user, when changing station, with a choice between the loss of the time-shift or its conservation (propagation) on this new station. In summary, it involves offering the user the choice to be able to extend the time-shift (or time-shifting) when changing station.

This functionality can be proposed with TV services offering nPVR (network personal video recorder), since in this case all the programs are recorded in the network (at least for a while) and it is possible, by changing station, to apply a time-shift (to the past) and therefore to conserve the time-shift.

In addition, it will also be possible to offer the user, when flicking to another station with or without conservation of the time-shift and if they so wish, the ability to return to the time-shift on their initial station (the service is then similar to resuming playback).

Therefore, this invention offers an additional service, notably for IPTV, and allows the user to manage (conserve/leave/return to) the time-shift during a change of stream as they wish, in particular when changing station.

The invention also relates to a medium. The information medium can be any entity or device capable of storing the program. For example, the medium can comprise a storage means, such as a ROM, for example, a CD-ROM or a microelectronic circuit ROM, or even a magnetic recording means, for example, a disk or a hard disk.

Moreover, the information medium can be a transmissible medium such as an electrical or optical signal, which can be routed via an electrical or optical cable, via a radio or via other means. The program according to the invention particularly can be downloaded over a network of the Internet type in particular.

Alternatively, the information medium can be an integrated circuit, in which the program is incorporated, with the circuit being adapted to execute or to be used to execute the method in question.

In another implementation, the invention is implemented by means of software and/or hardware components. In this context, the term module can equally correspond to a software component or to a hardware component. A software component corresponds to one or more computer programs, one or more sub-programs of a program, or, more generally, to any element of a program or software able to implement a function or a set of functions according to the above description. A hardware component corresponds to any element of a hardware assembly able to implement a function or a set of functions.

The invention claimed is:

1. A control method for controlling reproduction of transmitted data streams, the control method being implemented by a reproduction device and comprising:
controlling reproduction of at least one first transmitted data stream, wherein at least one data stream including the at least one first transmitted data stream is stored in a stream memory for a predetermined remanence duration; and
during a command for reproducing at least one second transmitted data stream, storing a reproduction time-shift duration for the stored at least one first transmitted data stream that is being reproduced, the at least one first transmitted data stream and the at least one second transmitted data stream being separate streams.

2. The control method according to claim 1, the control method comprising controlling a time-shifted playback of a data stream of the at least one data stream stored in the stream memory triggered by receiving a command for reproducing the data stream, the time-shifted playback being controlled so that the stored data stream is reproduced with a time-shift that is a function of the stored reproduction time-shift duration.

3. The control method according to claim 2, wherein the at least one data stream stored in the stream memory comprises the at least one second transmitted data stream, and wherein the stored data stream that is reproduced with time-shift as a function of the stored time-shift duration is a data stream from among the following data streams:
the stored at least one first transmitted data stream;
the stored at least one second transmitted data stream;
a third transmitted data stream, which is stored in the stream memory and is separate from the first and second streams.

4. The control method according to claim 1, the control method comprising, during the command for reproducing the at least one second data stream, generating a first interaction request which triggers a reproduction of a proposal to the user to conserve the reproduction time-shift duration, the storage being implemented in the event of receiving a positive response to the first interaction request.

5. The control method according to claim 1, the control method comprising, during a command for reproducing a new data stream, generating a second interaction request triggering a reproduction of a proposal to propagate the reproduction time-shift duration to the new data stream, with the time-shifted playback as a function of the stored time-shift duration being implemented on the new stored data stream in the event of receiving a positive response to the second interaction request.

6. The control method according to claim 5, wherein the new data stream reproduced with a time-shift as a function of the stored time-shift duration is stored in the stream memory and is a data stream from among the following data streams:
the first stored transmitted data stream;
the second stored transmitted data stream;
a third data stream.

7. A non-transitory computer readable medium comprising a program stored thereon comprising program code instructions for executing steps of a control method when said program is executed by a processor, wherein the control method comprises:
controlling reproduction of transmitted data streams, including at least one first transmitted data stream and at least one second transmitted data stream, the first transmitted data stream and the second transmitted data stream being separate streams, with at least one data stream including the at least one first transmitted data stream being stored in a computer readable medium for a predetermined remanence duration, the controlling comprising:
during a command for reproducing the second transmitted data stream, storing a reproduction time-shift duration for the first stored data stream that is being reproduced.

8. A reproduction device for controlling reproduction of transmitted data streams, the device comprising:
a time-shift memory;
a processor; and
a non-transitory computer readable medium comprising instructions stored thereon which when executed by the processor configure the reproduction device to:
control reproduction of at least one first transmitted data stream, wherein at least one data stream including the first transmitted data stream is stored in a stream memory for a predetermined remanence duration; and
store, during a command for reproducing a second data stream, a reproduction time-shift duration for the stored at least one first data stream that is being reproduced, the at least one first transmitted data stream and the second data stream being separate streams.

9. A network recorder comprising:
a stream memory storing, for a predetermined remanence duration, at least one data stream transmitted by a data stream source; and
a reproduction control device comprising:
a time-shift memory storing, during a command for reproducing a second data stream, a reproduction time-shift duration for a first data stream that is stored in the stream memory and that that is being reproduced.

10. The network recorder according to claim 9, the reproduction control device comprising a stream player configured to playback the at least one data stream stored in the stream memory with a time-shift as a function of the stored reproduction time-shift duration.

11. A data stream decoder for receiving transmitted data streams, the data stream decoder comprising:
a data stream selector configured to send to a reproduction device, a data stream selected from the received transmitted data streams and/or at least one stored data stream corresponding to at least one of the transmitted data streams, which is stored in a memory;
a reproduction control device, the reproduction control device comprising:
a time-shift memory storing, during a command for reproducing a second data stream, a reproduction time-shift duration for a first stored data stream that is being reproduced.

12. A data stream reproduction device, the reproduction device comprising:
an elementary device for reproducing at least one data stream;
a transmitted data stream selector, the selector being configured to send to the elementary reproduction device, a data stream that is selected from transmitted data streams and/or at least one stored data stream corresponding to at least one of the transmitted data streams, which is stored in a memory;
a reproduction control device, the reproduction control device comprising:
a time-shift memory storing, during a command for reproducing a second data stream, a reproduction time-shift duration for a first data stream that is stored in the memory and that is being reproduced by the elementary device.

* * * * *